(12) United States Patent
Nakamoto et al.

(10) Patent No.: US 10,569,957 B2
(45) Date of Patent: *Feb. 25, 2020

(54) TRANSPORTER

(71) Applicant: Kabushiki Kaisha Toshiba, Minato-ku (JP)

(72) Inventors: Hideichi Nakamoto, Setagaya (JP); Akihito Ogawa, Fujisawa (JP); Takafumi Sonoura, Yokohama (JP); Haruna Eto, Kawasaki (JP); Junya Tanaka, Ota (JP); Atsushi Sugahara, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,846

(22) Filed: Dec. 29, 2017

(65) Prior Publication Data

US 2018/0118463 A1 May 3, 2018

Related U.S. Application Data

(63) Continuation of application No. 15/262,128, filed on Sep. 12, 2016, now Pat. No. 9,889,991.

(30) Foreign Application Priority Data

Nov. 5, 2015 (JP) ................... 2015-217790

(51) Int. Cl.
*B65G 15/00* (2006.01)
*B65G 47/64* (2006.01)
*B65G 47/91* (2006.01)
*B65G 13/02* (2006.01)
*B65G 39/06* (2006.01)
(Continued)

(52) U.S. Cl.
CPC ............. *B65G 15/00* (2013.01); *B65G 13/02* (2013.01); *B65G 39/06* (2013.01); *B65G 41/005* (2013.01); *B65G 47/643* (2013.01); *B65G 47/647* (2013.01); *B65G 47/912* (2013.01); *B65G 47/54* (2013.01); *B65G 61/00* (2013.01)

(58) Field of Classification Search
None
See application file for complete search history.

(56) References Cited

U.S. PATENT DOCUMENTS 5,251,742 A * 10/1993 Campbell .............. B65G 15/62
198/841
5,263,813 A 11/1993 Kiederle
(Continued)

FOREIGN PATENT DOCUMENTS

JP 61-2610 A 1/1986
JP 61-37626 A 2/1986
(Continued)

*Primary Examiner* — William R Harp
(74) *Attorney, Agent, or Firm* — Oblon, McClelland, Maier & Neustadt, L.L.P.

(57) ABSTRACT

A transporter includes: a first conveyor to receive an object, the first conveyor to convey the object in a first direction; and a second conveyor to receive the object from the first conveyor and to convey the object, the second conveyor being movable in position in a second direction that crosses the first direction, the second direction being a substantially vertical direction.

8 Claims, 14 Drawing Sheets

(51) Int. Cl.
*B65G 41/00* (2006.01)
*B65G 61/00* (2006.01)
*B65G 47/54* (2006.01)

(56) References Cited

U.S. PATENT DOCUMENTS

| | | | |
|---|---|---|---|
| 5,683,222 A | 11/1997 | Ingelhag | |
| 6,105,751 A * | 8/2000 | Jentjens | B65G 47/715 198/435 |
| 6,345,950 B1 * | 2/2002 | Gerwitz | B65G 11/143 14/71.1 |
| 6,976,573 B2 * | 12/2005 | Brixius | B65G 47/57 198/435 |
| 8,162,128 B2 | 4/2012 | Kimura | |
| 8,376,129 B2 | 2/2013 | Kimura | |
| 8,651,262 B2 | 2/2014 | Kondo | |
| 9,676,562 B2 * | 6/2017 | Philipp | B65G 47/5113 |
| 9,757,858 B2 * | 9/2017 | Eto | B25J 9/1612 |
| 9,758,300 B2 | 9/2017 | Nakamura | |
| 9,889,991 B2 * | 2/2018 | Nakamoto | B65G 13/02 |
| 10,011,439 B2 * | 7/2018 | Sonoura | B65G 61/00 |
| 10,053,305 B2 * | 8/2018 | Eto | B65G 59/04 |
| 2003/0185656 A1 | 10/2003 | Hansl | |
| 2015/0158677 A1 * | 6/2015 | Philipp | B65G 47/5113 198/347.1 |
| 2015/0210472 A1 | 7/2015 | Nakamura | |
| 2015/0344225 A1 | 12/2015 | Nakamura et al. | |
| 2016/0137435 A1 | 5/2016 | Tanaka | |
| 2016/0347558 A1 | 12/2016 | Eto | |

FOREIGN PATENT DOCUMENTS

| | | |
|---|---|---|
| JP | 10-279012 A | 10/1998 |
| JP | 2001-253530 A | 9/2001 |
| JP | 2015-224125 A | 12/2015 |
| JP | 2016-055995 A | 4/2016 |
| WO | WO 2014/038387 A1 | 3/2014 |

* cited by examiner

TRANSPORTER

CROSS-REFERENCE TO RELATED APPLICATION

This application is a continuation of U.S. application Ser. No. 15/262,128 filed Sep. 12, 2016 and claims priority from Japanese Patent Application No. 2015-217790 filed on Nov. 5, 2015, the contents of each of which are incorporated herein by reference in their entirety.

FIELD

Embodiments described herein relate generally to a transporter and a transport method.

BACKGROUND

A transporter which takes out an object from a pallet is known.

In some cases, it is difficult for such transporters to convey an object at a high speed.

DETAILED DESCRIPTION

Figure 1A:
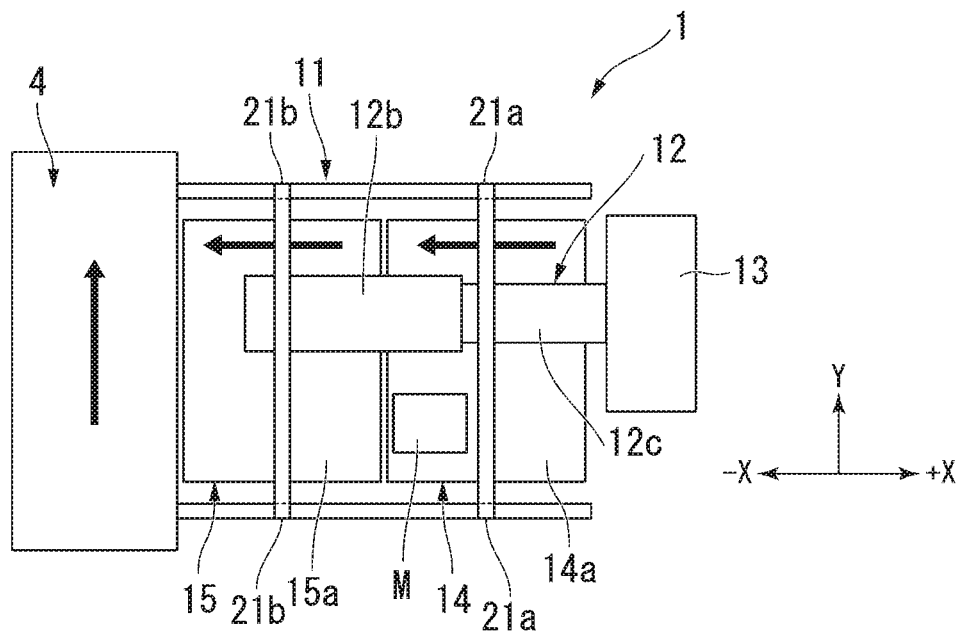
FIGS. 1A and 1B are views showing a transporter of a first embodiment.

According to one embodiment, a transporter includes a first conveyor and a second conveyor. The first conveyor receives an object that is carried by an arm device and conveys the object in a first direction. The second conveyor is configured to receive and convey the object from the first conveyor and is movable in a second direction that crosses the first direction.

Hereinafter, transporters and transport methods of embodiments will be described with reference to the drawings. Moreover, in the following description, the configurations having the same or similar functions will be assigned by the same reference numerals. Redundant descriptions may be omitted.

First Embodiment

A first embodiment will be described with reference to FIGS. 1 to 3.

Figure 1B:
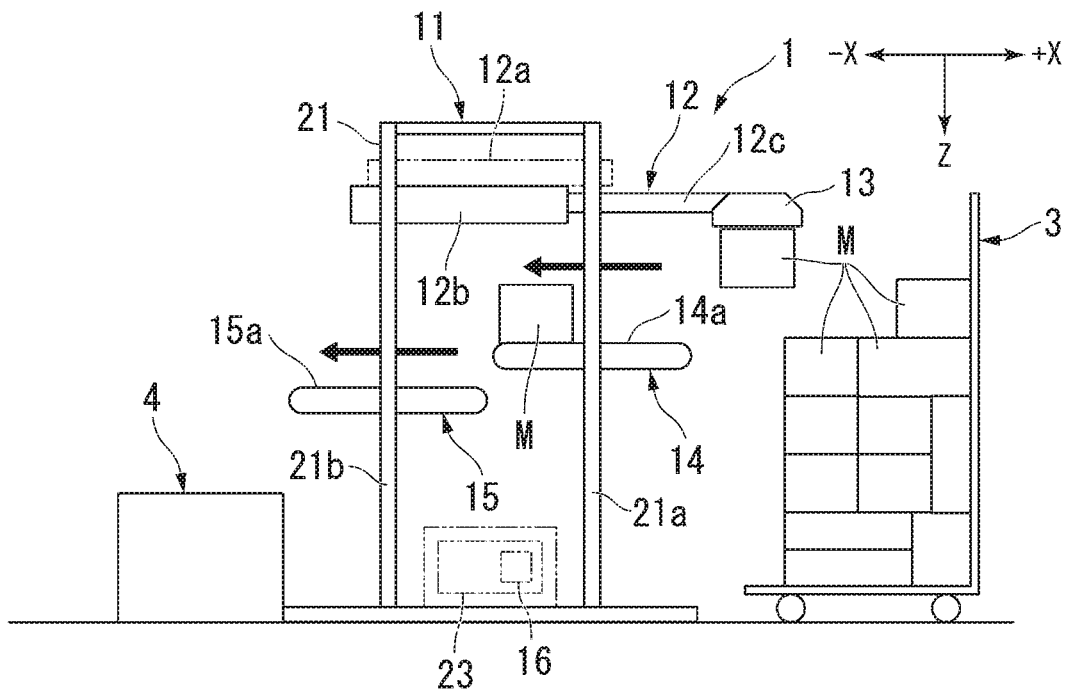

FIGS. 1A and 1B are views showing a transporter 1 of the embodiment. In addition, FIG. 1A is a plan view showing the transporter 1. FIG. 1B is a side view showing the transporter 1.

As shown in FIGS. 1A and 1B, for example, the transporter 1 is an automatic unloading apparatus. The transporter 1 takes out an object (object to be conveyed and object to be held) M placed on a first placement section (first load section) and moves the object to a second placement section (second load section). The transporter 1 may be referred to as a "cargo handling apparatus". The object M conveyed by the transporter 1 is not limited to a packaged baggage, and may be components on a manufacturing line. The transporter 1 and the transport method of the embodiment can be widely applied to a logistic automatic input device, an object supply apparatus of factory, or the like.

In the embodiment, the first placement section is a box pallet 3. For example, the box pallet 3 is a roll box pallet (RBP) having wheels. On the other hand, the second placement section is a belt conveyor 4. The transporter 1 and the belt conveyor 4 are fixed to a floor surface. However, the transporter 1 can be moved by wheels, rails, or the like. In addition, each of the first placement section and the second placement section is not limited to the above-described examples, and for example, may be any of a belt conveyor, a dolly, a pallet, a workbench, or the like. In addition, hereinafter, for convenience of description, the belt conveyor 4 is referred to as an "input conveyor 4".

Here, for convenience of description, a +X-direction, a −X-direction, a Y-direction, and a Z-direction are defined as follows. For example, the +X-direction, the −X-direction, and the Y-direction are directions along a substantially horizontal surface. The +X-direction is a direction from the transporter 1 toward the first placement section. The −X-direction is a direction opposite to the +X-direction. The Y-direction is a direction (for example, a direction substantially orthogonal to the +X-direction) that crosses the +X-direction, and is a width direction of the object M, for example. The Z-direction is a direction (for example, a direction substantially orthogonal to the +X-direction and the Y-direction) that crosses the +X-direction and the Y-direction, and is a substantially vertical and downward direction, for example.

In addition, in the following description, an "upstream" and a "downstream" mean the "upstream" and the "downstream" in the conveyance direction of the object M.

As shown in FIGS. 1A and 1B, the transporter 1 includes a base 11, an arm device 12, a holder (retainer) 13, a first conveyor 14, a second conveyor 15, and a controller 16.

The base (main frame) 11 is provided on a floor surface. The base 11 includes a plurality of supports 21 extending in the Z-direction and is formed in a frame shape, for example. The plurality of supports 21 includes a pair of first supports 21a and a pair of second supports 21b. The pair of first supports 21a is disposed to be divided into both sides in the Y-direction of the first conveyor 14. The pair of second supports 21b is disposed to be divided into both sides in the Y-direction of the second conveyor 15.

For example, the arm device 12 is an orthogonal robot arm and is an example of a multi-joint arm. The arm device 12 is connected to the base 11. For example, the arm device 12 includes a first member 12a, a second member 12b, and a third member 12c. The first member 12a is guided by a guide which is provided on the base 11, and is movable (can be lifted and lowered) along the Z-direction. The second member 12b is supported and guided by the first member 12a, and is movable along the Y-direction. The third member 12c is supported and guided by the second member 12b, and is movable in the +X-direction and −X direction. The holder 13 described below is attached to the tip of the arm device 12. The arm device 12 moves the holder 13 to a desired position in the +X-direction (−X-direction), Y-direction, and Z-direction.

In addition, the "arm device" referred to in the embodiments broadly means a member which moves the holder 13 to a desired position and is not necessarily limited to a rod-shaped member. The arm device 12 may be referred to as a "driver" or a "moving mechanism" which moves the holder 13. In addition, the "object carried by the arm device" referred to in the embodiments includes an object which is held by the holder attached to the arm device so as to be carried.

The holder 13 is an end effector which can hold the object M. An example of the holder 13 includes a plurality of suckers which are connected to a vacuum pump, and a solenoid valve which controls suction operations of the suckers. The suckers, which are in contact with the object M, are vacuum-suctioned, and thus, the holder 13 holds (retains) the object M. In addition, the holder 13 is not limited to the suction, and may be any one as long as it can hold the object M by clamping the object M. In addition, the "retain" referred to in the embodiments is used in a broad meaning of "taking an object" and is not limited to a meaning such as "mechanically retain".

The holder 13 is moved toward the box pallet 3 by the arm device 12 and holds the object M placed on the box pallet 3. In addition, the holder 13 is moved by the arm device 12 and the holder 13 carries the held object M to the first conveyor 14. The holder 13 releases the holding with respect to the object M in a state where the holder 13 moves the object M to the first conveyor 14. Accordingly, the transporter 1 moves the object M placed on the box pallet 3 to the first conveyor 14. In addition, the holder 13 can simultaneously hold the plurality of objects M. That is, the holder 13 simultaneously holds the plurality of objects M, and may carry the plurality of objects M from the box pallet 3 to the first conveyor 14 once.

The first conveyor 14 is positioned between the box pallet 3 and the input conveyor (third conveyor) 4 in the −X-direction. The first conveyor 14 is provided on the base 11, and is positioned below at least a portion of the arm device 12. The first conveyor 14 is connected to the base 11 and is supported by the base 11.

For example, the first conveyor 14 is a belt conveyor. The first conveyor 14 is disposed toward the input conveyor 4. That is, the first conveyor 14 has a conveyance surface (upper surface) 14a which moves toward the input conveyor 4. The first conveyor 14 receives the object M carried by the arm device 12, and conveys the object M in the −X-direction. The −X-direction is an example of the "first direction" and is an example of the "conveyance direction". The first conveyor 14 may have a width capable of simultaneously conveying the plurality of objects M arranged in the Y-direction.

The first conveyor 14 of the embodiment is a lift conveyor which is movable along the Z-direction.

For example, the first conveyor 14 is connected to the first supports 21a of the base 11. The first conveyor 14 is guided by a guide that is provided on the first supports 21a, and is movable (liftable) along the Z-direction. For example, the first conveyor 14 moves to a desired position in the Z-direction according to a stacking height (conveyance height of the object M by the arm device 12) of the objects M on the box pallet 3. The Z-direction is an example of the "second direction". The Z-direction is a direction (for example, substantially orthogonal to a conveyance surface 14a) that crosses the conveyance surface 14a of the first conveyor 14.

The second conveyor 15 is positioned between the first conveyor 14 and the input conveyor 4 in the −X-direction. The second conveyor 15 is provided on the base 11 and is positioned below at least a portion of the arm device 12. In addition, the second conveyor 15 may be disposed at a position which is deviated from the lower side of the arm device 12. The second conveyor 15 is connected to the base 11 and is supported by the base 11.

For example, the second conveyor 15 is a belt conveyor. The second conveyor is disposed toward the input conveyor 4. That is, the second conveyor 15 has a conveyance surface (upper surface) 15a which moves toward the input conveyor 4. In the embodiment, the second conveyor 15 is positioned on the downstream side of the first conveyor 14. In addition, the input conveyor 4 is positioned on the downstream side of the second conveyor 15. The second conveyor 15 receives the object M, which is conveyed by the first conveyor 14, from the first conveyor 14, and conveys the object M in the −X-direction. The second conveyor 15 may have a width capable of simultaneously conveying the plurality of objects M arranged in the Y-direction.

The second conveyor 15 of the embodiment is a lift conveyor which is movable along the Z-direction. The second conveyor 15 is movable in the Z-direction independently from the first conveyor 14.

For example, the second conveyor 15 is connected to the second supports 21b of the base 11. The second conveyor 15 is guided by a guide which is provided on the second supports 21b, and is movable (liftable) along the Z-direction. For example, the second conveyor 15 moves to a desired position in the Z-direction such that the height of the second conveyor 15 is aligned with the height of the first conveyor 14. In addition, the second conveyor 15 moves to a desired position in the Z-direction such that the height of the second conveyor 15 is aligned with the height of the input conveyor 4.

Since the second conveyor 15 is positioned at substantially the same height as that of the first conveyor 14, the second conveyor 15 receives the object M from the first conveyor 14. In addition, the second conveyor 15 is positioned at substantially the same height as that of the input conveyor 4, and thus, delivers the object M from the second conveyor 15 to the input conveyor 4. In addition, "the first conveyor and the second conveyor being positioned at substantially the same height as each other" referred to in the embodiments means that the conveyance surface (for example, upper surface) of the first conveyor and the conveyance surface (for example, upper surface) of the second conveyor are positioned at substantially the same height as each other. In addition, "the second conveyor and the input conveyor being positioned at substantially the same height as each other" referred to in the embodiments means that the conveyance surface (for example, upper surface) of the second conveyor and the conveyance surface (for example, upper surface) of the input conveyor are positioned at substantially the same height as each other.

Moreover, each of the first conveyor 14 and the second conveyor 15 is not limited to the belt conveyor. Each of the first conveyor 14 and the second conveyor 15 is a roller conveyor which is formed of a plurality of rollers which are actively rotated. In this case, each of the conveyance surfaces 14a and 15a referred to in the embodiments means a virtual surface on which the apexes of the upper ends of the plurality of rollers are connected to each other.

The controller (control circuit) 16 controls the overall operation of the transporter 1. That is, the controller 16 controls various operations of the arm device 12, the holder 13, the first conveyor 14, and the second conveyor 15. For example, the controller 16 is realized by the entire portion or a portion of a circuit substrate (control substrate) 23 including a processor such as a Central Processing Unit (CPU). For example, the controller 16 is a software functioner which is realized by a processor such as a CPU executing a program stored in a memory of the circuit substrate 23. Alternatively, the controller 16 may be realized by hardware such as a Large Scale Integration (LSI), an Application Specific Integrated Circuit (ASIC), and a Field-Programmable Gate Array (FPGA) mounted on the circuit substrate 23.

Figure 2:
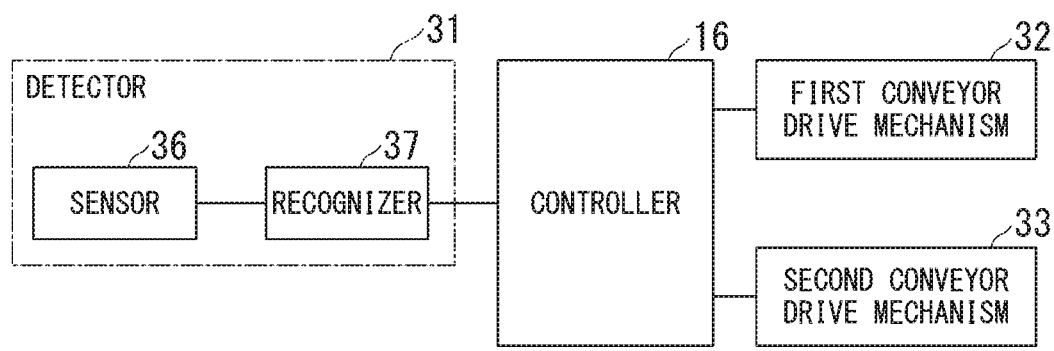
FIG. 2 is a block diagram showing a part of a system configuration of the transporter of the first embodiment.

FIG. 2 shows a part of the system configuration of the transporter 1.

As shown in FIG. 2, the transporter 1 includes a detector 31, a first conveyor drive mechanism 32, and a second conveyor drive mechanism 33, in addition to the above-described configuration.

The detector 31 detects the presence or absence of the object M on the first conveyor 14, and the presence or absence of the object M on the second conveyor 15. Specifically, the detector 31 includes a sensor 36 and a recognizer 37. For example, the sensor 36 is a camera which photographs the first and second conveyors 14 and 15 from above. In addition, the sensor 36 may be individually provided on each of the first and second conveyors 14 and 15. In addition, the sensor 36 may be a sensor different from the camera. For example, the recognizer (analyzer) 37 is formed of a circuit of a portion of the circuit substrate 23. For example, the recognizer 37 is a software functioner which is realized by a processor such as a CPU executing a program stored in a memory of the circuit substrate 23. Alternatively, the recognizer 37 may be realized by hardware such as the LSI, the ASIC, and the FPGA mounted on the circuit substrate 23. The recognizer 37 detects the presence or absence of the object M on the first conveyor 14, and the presence or absence of the object M on the second conveyor 15, based on data acquired by the sensor 36. The detector 31 delivers the detection result of the detector 31 to the controller 16. In addition, the recognizer 37 and the controller 16 may be collectively realized so as to form a chip component, or may be individually realized so as to form two or more chip components. In addition, the recognizer 37 is not provided on the circuit substrate 23, and may be provided inside the sensor 36 as a portion of the sensor 36.

The first conveyor drive mechanism 32 is provided on the base 11, and includes a motor, a ball screw, or the like which moves the first conveyor 14 in the Z-direction. The controller 16 controls the first conveyor drive mechanism 32, and thus, moves the first conveyor 14 to a desired position in the Z-direction.

The second conveyor drive mechanism 33 is provided on the base 11, and includes a motor, a ball screw, or the like which moves the second conveyor 15 in the Z-direction. The controller 16 controls the second conveyor drive mechanism 33, and thus, moves the second conveyor 15 to a desired position in the Z-direction.

Next, a transport method using the transporter 1 of the embodiment will be described.

Figure 3:
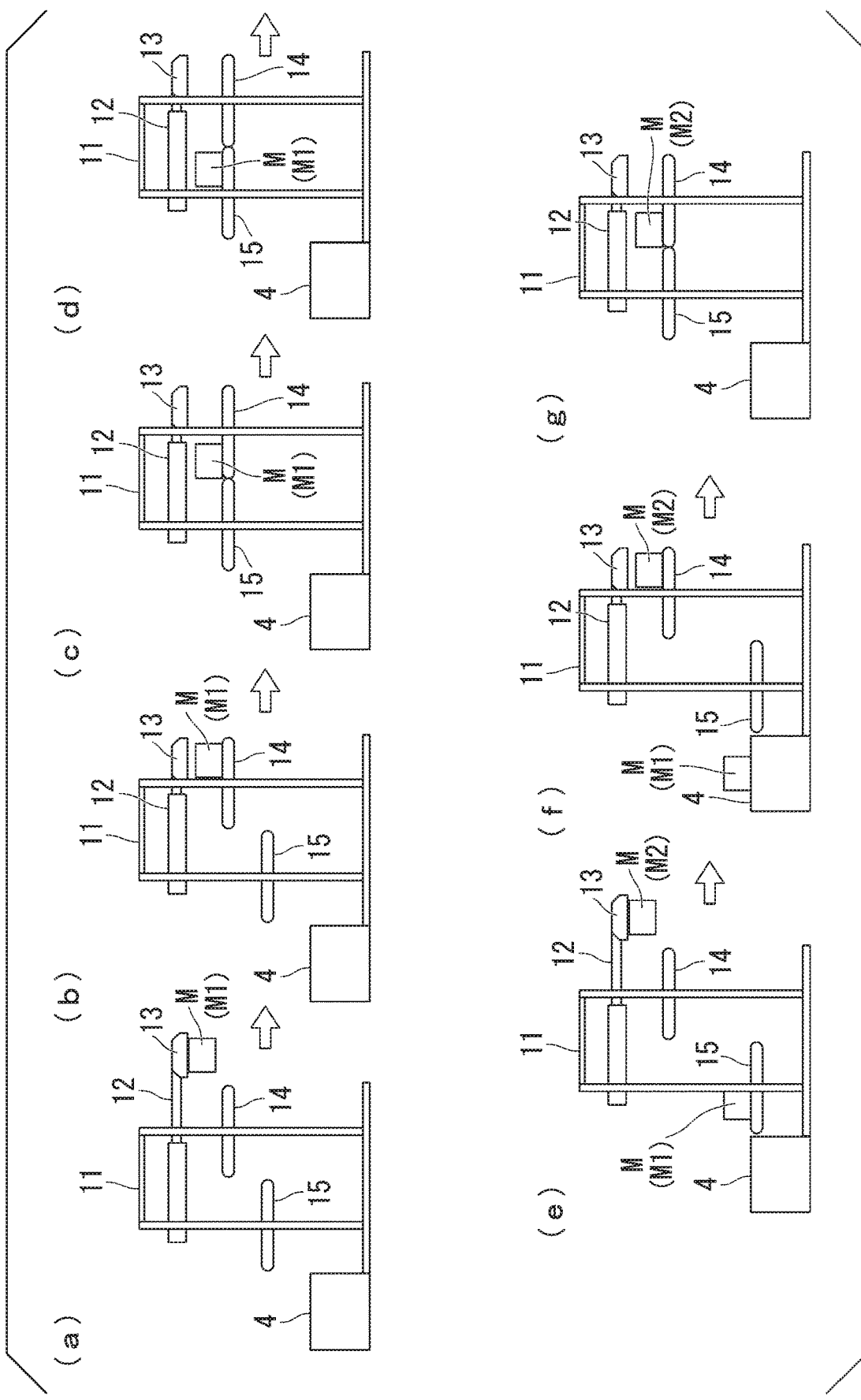
FIG. 3 is a side view showing an example of a transport method of the transporter of the first embodiment.

FIG. 3 shows an example of the transport method of the transporter 1.

First, as shown in (a) of FIG. 3, the controller 16 controls the arm device 12, and thus, moves the holder 13 toward the object M loaded on the box pallet 3. In addition, the controller 16 controls the solenoid valve of the holder 13, and holds the object M by the holder 13.

In addition, the controller 16 controls the first conveyor drive mechanism 32, and thus, moves the first conveyor 14 in the Z-direction according to the stacking height (the conveyance height of the object M carried by the arm device 12) of the object M on the box pallet 3. For example, the controller 16 moves the first holder 14 to a position which is slightly lower than the lower surface of the object M held by the holder 13, and causes the first conveyor 14 to be in a standby state. In addition, in this case, the second conveyor 15 may be positioned at substantially the same height as that of the first conveyor 14, or may be positioned at the height different from that of the first conveyor 14. The "substantially same height as that of the first conveyor" is an example of a "position at which the first conveyor and the second conveyor are aligned with each other".

Next, as shown in (b) of FIG. 3, after the controller 16 moves the object M on the first conveyor 14, and the controller 16 releases the holding with respect to the object M. Accordingly, the object M carried by the arm device 12 moves to the first conveyor 14. In addition, in this case, the second conveyor 15 may be positioned at substantially the same height as that of the first conveyor 14, or may be positioned at the height different from that of the first conveyor 14.

Next, as shown in (c) of FIG. 3, the controller 16 controls the second conveyor drive mechanism 33, and thus, moves the second conveyor 15 to substantially the same height as that of the first conveyor 14. In addition, the controller 16 controls the first conveyor 14, and thus, conveys the object M loaded on the first conveyor 14 in the −X direction. In addition, the conveyance of the object M performed by the first conveyor 14 may start before the second conveyor 15 reaches substantially the same height as that of the first conveyor 14. According to this operation, it is possible to further increase the speed of the conveyance of the object M. Moreover, the conveyance of the object M performed by the first conveyor 14 may start after the second conveyor 15 reaches substantially the same height as that of the first conveyor 14.

Next, as shown in (d) of FIG. 3, the second conveyor 15 is positioned at substantially the same height as that of the first conveyor 14, and thus, the second conveyor 15 receives the object M from the first conveyor 14. In other words, the second conveyor 15 receives the object M from the first conveyor 14 at a position (for example, a higher position or a lower position than that of the input conveyor 4) moving away from the input conveyor 4. If the object M moves from the first conveyor 14 to the second conveyor 15, the detector 31 detects the object M moving to the second conveyor 15. If the object M moving to the second conveyor 15 is detected by the detector 31, the controller 16 controls the second conveyor drive mechanism 33, and thus, moves the second conveyor 15 toward substantially the same height as that of the input conveyor 4. Accordingly, the second conveyor 15 moves away from substantially the same height as that of the first conveyor 14.

Here, for example, if the object M moves to the second conveyor 15, the controller 16 controls the arm device 12, and thus, moves the arm device 12 toward the object M which is an object to be conveyed next. That is, in a state where the second conveyor 15 moves away from substantially the same height as that of the first conveyor 14, the controller 16 moves the arm device 12 toward the next object M. In addition, hereinafter, for convenience of description, the object M which has been conveyed previously is referred to as a "first object M1", and the object M which is conveyed after a first object M is referred to as a "second object M2".

In addition, as shown in (e) of FIG. 3, the controller 16 controls the second conveyor 15, and thus, conveys the first object M1 placed on the second conveyor 15 in the −X-direction. In addition, the conveyance of the object M performed by the second conveyor 15 may be performed before the second conveyor 15 reaches substantially the same height as that of the input conveyor 4 (for example, while the second conveyor 15 moves in the Z-direction). According to this operation, it is possible to further increase the speed of the conveyance of the object M. In addition, the conveyance of the object M performed by the second conveyor 15 may start after the second conveyor 15 reaches substantially the same height as that of the input conveyor 4.

Here, in the embodiment, in the state where the second conveyor 15 moves away from substantially the same height as that of the first conveyor 14, the controller 16 holds the second object M2 by the holder 13 and takes out the second object M2 from the box pallet 3. In addition, in the state where the second conveyor 15 moves away from substantially the same height as that of the first conveyor 14, the controller 16 controls the arm device 12, and thus, carries the second object M2 held by the holder 13 toward the first conveyor 14.

Next, as shown in (f) of FIG. 3, the second conveyor 15 is positioned at substantially the same height as that of the input conveyor 4, and thus, delivers the first object M1 from the second conveyor 15 to the input conveyor 4. If the first object M1 moves from the second conveyor 15 to the input conveyor 4, the detector 31 detects the first object M1 moving to the input conveyor 4. Moreover, in the embodiment, for example, the controller 16 releases the holding of the holder 13 in the state where the second conveyor 15 moves away from substantially the same height of that of the first conveyor 14, and thus, the controller 16 moves the second object M2 to the first conveyor 14.

Next, as shown in (g) of FIG. 3, if the detector 31 detects the first object M1 moving to the input conveyor 4, the controller 16 controls the second conveyor drive mechanism 33, and thus, moves the second conveyor 15 toward substantially the same height as that of the first conveyor 14. In addition, the second conveyor 15 is positioned at substantially the same height as that of the first conveyor 14, and thus, receives the second object M2 from the first conveyor 14.

According to the transporter 1 and the transport method having the above-described configurations, it is possible to increase the speed of conveyance. Here, some comparative examples are considered. First, a transporter in which the lift conveyor is not provided is considered. In this transporter, in order to reliably retain an object, a size of a retainer mechanism increases. Accordingly, a decrease in the size of the transporter may be difficult.

Therefore, a transporter in which the lift conveyor which receives the object carried by the arm device is provided is considered. Since the lift conveyor is provided, it is possible to decrease a time when the object is retained by the arm device. Accordingly, it is possible to stably convey the object by a relatively small retainer mechanism.

However, in a case where one lift conveyor is provided, until the lift conveyor moves to the height of the input conveyor to deliver the object to the input conveyor and the lift conveyor is returned to the original height after the lift conveyor receives the object carried by the arm device, in some cases, the next object cannot be taken out by the arm device. Accordingly, a standby time of the arm device is lengthened, and an increase in speed of the conveyance may be difficult.

Therefore, the transporter 1 of the embodiment includes the first conveyor 14 and the second conveyor 15. The first conveyor 14 receives the object M carried by the arm device 12 and conveys the object M in the −X-direction. The second conveyor 15 receives the object M from the first conveyor 14, conveys the object M, and is movable in the Z-direction that crosses the −X direction.

According to this configuration, the operation of taking the object M by the arm device 12 and the operation of delivering the object M to the input conveyor 4 can be performed in parallel (that is, simultaneously performed).

Accordingly, the standby time of the arm device 12 does not exist or can be shortened. Therefore, it is possible to increase the speed of the conveyance of the object M. Moreover, in the above-described configuration, since the second conveyor 15 is disposed between the first conveyor 14 and the input conveyor 4, it is possible to realize the transporter 1 suitable for miniaturization.

The transport method of the embodiment includes receiving the object M, which has been carried by the arm device 12, by the first conveyor 14 and conveying the object M in the −X-direction, receiving the object M from the first conveyor 14 by the second conveyor 15, and moving the second conveyor 15 in the Z-direction that crosses the −X-direction. According to this configuration, due to reasons similar to the above-described those, it is possible to increase the speed of the conveyance of the object M.

In the embodiment, the first conveyor 14 is movable in the Z-direction. The second conveyor 15 is movable in the Z-direction independently from the first conveyor 14.

According to this configuration, it is possible to move the first conveyor 14 to a desired position in the Z direction according to the height of conveyance of the object M performed by the arm device 12. Accordingly, it is possible to further stabilize the conveyance of the object M.

In the embodiment, the arm device 12 carries the next object M (second object M2) in a state where the second conveyor 15 moves away from the position of being aligned with the first conveyor 14. According to this configuration, it is possible to further shorten the standby time of the arm device 12.

Second Embodiment

Next, a second embodiment will be described with reference to FIGS. 4 and 5.

The embodiment is different from the first embodiment in that the conveyors 14 and 15 have shock absorbers 41. In addition, configurations except for configurations described below are similar to those of the first embodiment.

Figure 4A:
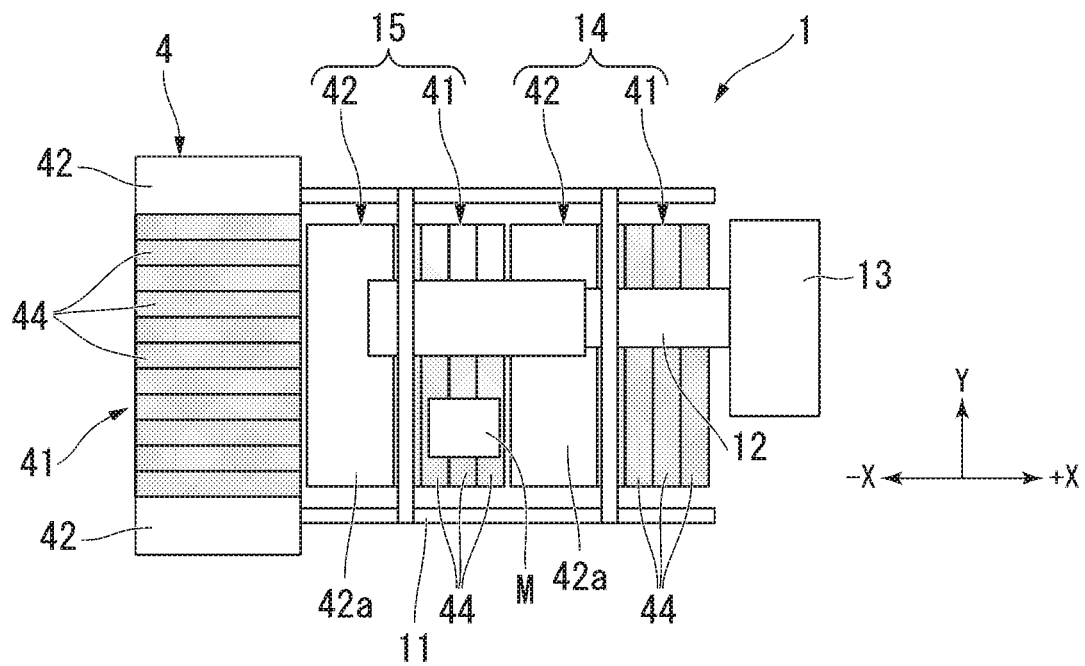
FIGS. 4A and 4B are views showing a transporter of a second embodiment.
Figure 4B:
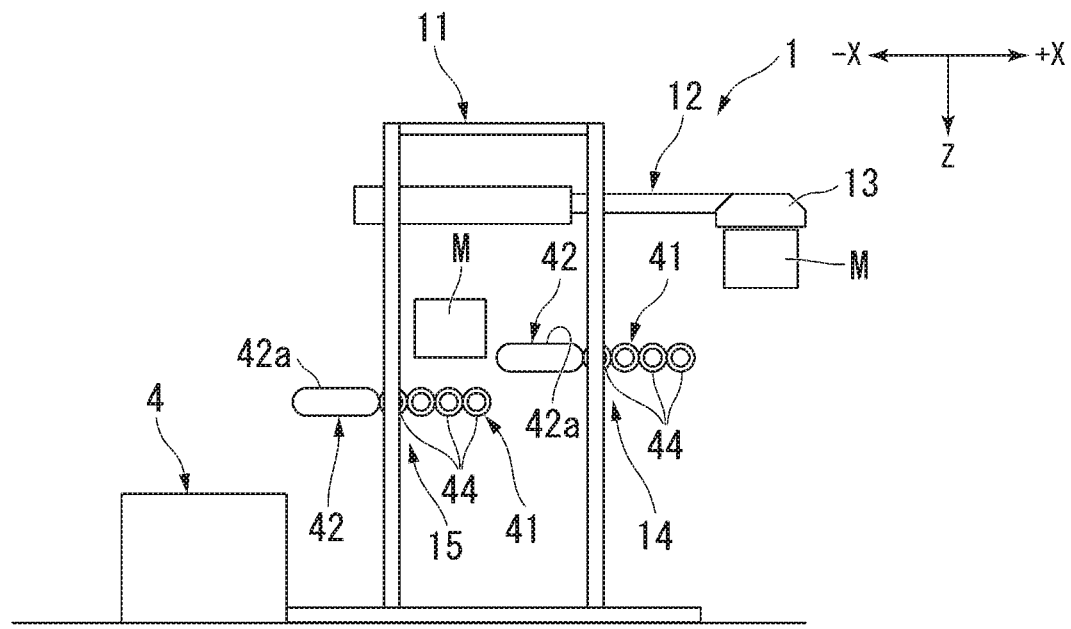

FIGS. 4A and 4B show the transporter 1 of the embodiment. In addition, FIG. 4A is a plan view showing the transporter 1. FIG. 4B is a side view showing the transporter 1. In FIG. 4A, for convenience of description, the shock absorbers 41 are hatched.

As shown in FIGS. 4A and 4B, in the embodiment, a portion of each of the first and second conveyors 14 and 15 is formed of the shock absorber 41. Specifically, each of the first and second conveyors 14 and 15 includes the shock absorber (impact-absorption conveyor unit, first conveyor unit) 41, and a general conveyor unit (second conveyor unit) 42. The shock absorber 41 is provided on a portion including the upstream end of each of the first and second conveyors 14 and 15. On the other hand, the general conveyor unit 42 is provided on a portion including the downstream end of each of the first and second conveyors 14 and 15.

Figure 5:
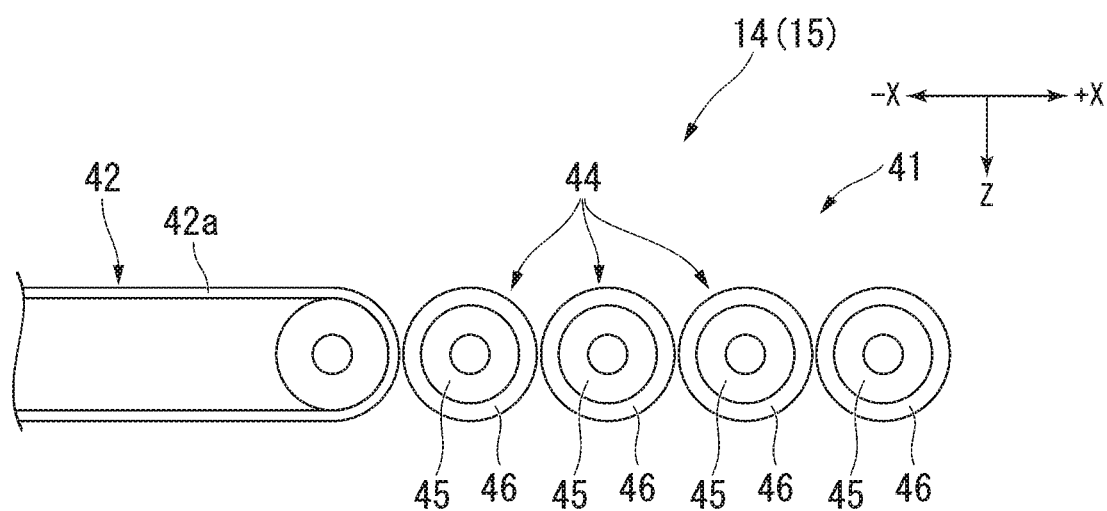
FIG. 5 is a side view showing a shock absorber of the second embodiment.

FIG. 5 shows an example of the shock absorber 41.

As shown in FIG. 5, for example, the shock absorber 41 includes a plurality of impact-absorption rollers 44 which are arranged in the −X-direction. Each impact-absorption roller 44 includes a roller (rotor) 45 which is actively rotated, and an impact-absorption material 46 which is attached to the peripheral surface of the roller 45. The impact-absorption material 46 is formed of a material having elasticity (cushioning properties). For example, the impact-absorption material 46 is sponge. Even in a case where the object M is dropped on the impact-absorption material 46 at a predetermined height, the impact-absorption material 46 absorbs the dropping impact and reduces damages with respect to the object M. For example, the impact-absorption material 46 is a member which has greater elasticity (that is, softer, and is more easily deformed) than that of the roller 45. In addition, in another viewpoint, for example, the impact-absorption material 46 is a member which has greater elasticity than that of the surface element of the object M. For example, the impact-absorption material 46 is a member which has greater elasticity than that of the general conveyor unit 42 (for example, a belt 42a of the conveyor unit 42). For example, the impact-absorption material 46 is a member which has greater elasticity than that of the input conveyor 4 (for example, the belt of the input conveyor 4).

In addition, the shock absorber 41 is not limited to the configuration which includes the plurality of impact-absorption rollers 44. The shock absorber 41 may be formed of a belt conveyor which is suspended to a plurality of rollers. In the case, for example, the above-described impact-absorption material 46 is attached to the surface of the belt of the belt conveyor. In this case, the belt of the belt conveyor is an example of the "rotor".

The shock absorber 41 relieves an impact of the contact of the object M with respect to the first conveyor 14 or the second conveyor 15. For example, the shock absorber 41 of the first conveyor 14 absorbs a portion of an impact applied to the object M when the object M carried by the arm device 12 is placed on the first conveyor 14. In addition, the shock absorber 41 of the second conveyor 15 absorbs a portion of an impact applied to the object M when the object M moves from the first conveyor 14 to the second conveyor 15. Moreover, the impact-absorption rollers 44 (or the belt of the belt conveyor) are actively rotated, and thus, the shock absorbers 41 of the first and second conveyors 14 and 15 convey the object M in the −X-direction.

As shown in FIGS. 4A and 4B, for example, in the embodiment, the length in the −X-direction of the shock absorber 41 is longer than the length in the −X-direction of the object M which is an object to be conveyed by the transporter 1. In addition, the shock absorbers 41 may be provided over the entire length in the −X-direction of the first and second conveyors 14 and 15.

For example, the shock absorbers 41 are provided over the entire width of the first and second conveyors 14 and 15 in the Y direction.

On the other hand, the conveyor unit (second conveyor unit) 42 is a belt conveyor similar to each of the conveyors 14 and 15 of the first embodiment. Moreover, the conveyor unit 42 may be a roller conveyor which is formed of a plurality of rollers that are actively rotated.

In the embodiment, a portion of the input conveyor 4 is formed of the shock absorber 41.

Specifically, the input conveyor 4 includes the shock absorber (impact-absorption conveyor unit, first conveyor unit) 41, and the general conveyor unit (second conveyor unit) 42. In the input conveyor 4, the shock absorber 41 is provided in a region which is adjacent to the second conveyor 15 in the +X-direction. Moreover, the details of the shock absorber 41 and the conveyor unit 42 of the input conveyor 4 are similar to those of the shock absorber 41 and the conveyor unit 42 of each of the first and second conveyors 14 and 15. The shock absorber 41 of the input conveyor 4 relieves the impact of the contact of the object M with respect to the input conveyor 4. That is, the shock absorber 41 of the input conveyor 4 absorbs a portion of the impact applied to the object M when the object M moves from the second conveyor 15 to the input conveyor 4. Moreover, the impact-absorption rollers 44 (or the belt of the belt conveyor) are actively rotated, and thus, the shock absorber 41 of the input conveyor 4 conveys the object M in the Y-direction.

Next, a control operation of the controller 16 of the embodiment will be described.

In the embodiment, even in a case where there is a gap (that is, a gap in which the object M is dropped) between the lower surface of the object M carried by the arm device 12 and the first conveyor 14, if the gap is smaller than a predetermined value which is preset, the controller 16 releases the holding of the holder 13 and moves the object M to the shock absorber 41 of the first conveyor 14.

In addition, even in a case where the heights of the first conveyor 14 and the second conveyor 15 are not aligned with each other, if the difference between the heights of the first conveyor 14 and the second conveyor 15 is smaller than a predetermined value which is preset, the controller 16 drives the first conveyor 14, and thus, moves the object M from the first conveyor 14 to the shock absorber 41 of the second conveyor 15.

Moreover, even in a case where the heights of the second conveyor 15 and the input conveyor 4 are not aligned with each other, if the difference between the heights of the second conveyor 15 and the input conveyor 4 is smaller than a predetermined value which is preset, the controller 16 drives the second conveyor 15, and thus, moves the object M from the second conveyor 15 to the shock absorber 41 of the input conveyor 4.

According to this configuration, similarly to the first embodiment, it is possible to increase the speed of the conveyance. In addition, the second conveyor 15 includes the shock absorber 41 which can relieve the impact of the contact of the object M with respect to the second conveyor 15. According to this configuration, even when the heights of the first conveyor 14 and the second conveyor 15 are not completely aligned with each other, it is possible to convey the object M from the first conveyor 14 to the second conveyor 15. That is, if the first conveyor 14 is positioned at a higher position than that of the second conveyor 15, it is possible to drop the object M from the first conveyor 14 to the second conveyor 15 so as to be delivered without any adjustment with respect to the heights. If it is not necessary to completely align the heights of the two conveyors 14 and 15 with each other, it is possible to decrease distances in lifting and lowering operations of the conveyors 14 and 15, and it is possible to decrease times for the lifting and lowering operations. Therefore, according to this configuration, it is possible to further increase the speed of the conveyance.

In addition, according to the similar reasons, in a case where the shock absorber 41 is provided in the first conveyor 14, it is possible to drop the object M carried by the arm device 12 to the first conveyor 14 so as to be delivered. In addition, in a case where the shock absorber 41 is provided in the input conveyor 4, it is possible to drop the object M from the second conveyor 15 to the input conveyor 4 so as to be delivered. Accordingly, it is possible to decrease the distances in the lifting and lowering operations of the conveyors 14 and 15, and it is possible to further increase the speed of the conveyance.

Moreover, in the embodiment, the holder 13 can simultaneously hold a plurality of objects M.

Here, the holding surface of the holder 13 is a substantially flat surface. Accordingly, in a case where the plurality of objects M are simultaneously held by the holder 13, if the heights of the plurality of objects M are different from each other, the positions of the lower surface of the objects M are different from each other. Therefore, if the holder 13 releases the holding with respect to the plurality of objects M, the object M having a small height is dropped to the first conveyor 14 at a predetermined height.

However, in the embodiment, the first conveyor 14 has the shock absorber 41. Accordingly, it is possible to absorb a portion of the impact applied to the object M by the shock absorber 41. In other words, since the first conveyor 14 has the shock absorber 41, it possible to simultaneously hold and convey the plurality of objects M having heights different from each other by the holder 13. Therefore, it is possible to further increase the speed of the conveyance.

In the embodiment, each of the first and second conveyors 14 and 15 includes the general conveyor unit 42 on the downstream side of the shock absorber 41. If the general conveyor unit 42 is provided, stability in the conveyance of the conveyors 14 and is improved. Therefore, it is possible to increase reliability in the conveyance of the transporter 1. Moreover, if the general conveyor unit 42 is provided, compared to a case where the entire portion of each of the conveyors 14 and 15 is formed of the shock absorber 41, it is possible to reduce the costs of the conveyors 14 and 15.

In addition, it is not necessary to provide the shock absorber 41 to all of the first conveyor 14, the second conveyor 15, and the input conveyor 4. The shock absorber 41 may be provided on any one or two of the first conveyor 14, the second conveyor 15, and the input conveyor 4.

Third Embodiment

Next, a third embodiment will be described with reference to FIGS. 6A and 6B.

The embodiment is different from the first embodiment in that extensible members 51 and 52 are provided among the conveyors 14, 15, and 4. In addition, configurations except for configurations described below are similar to those of the first embodiment.

Figure 6A:
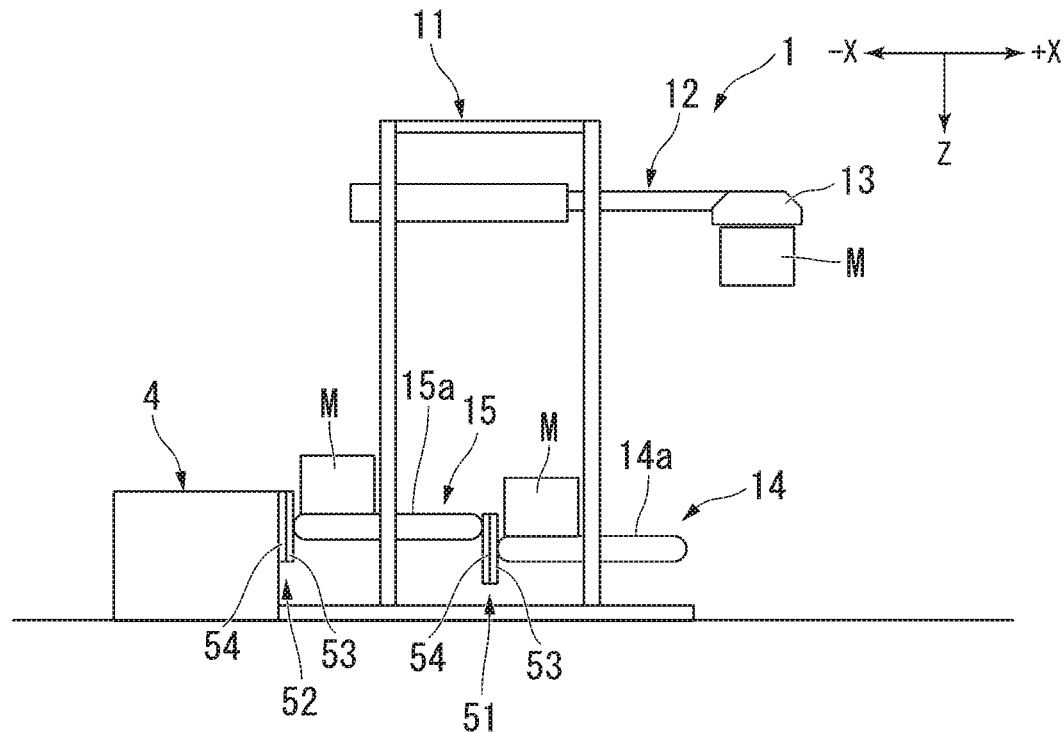
FIGS. 6A and 6B are side views showing a transporter of a third embodiment.
Figure 6B:
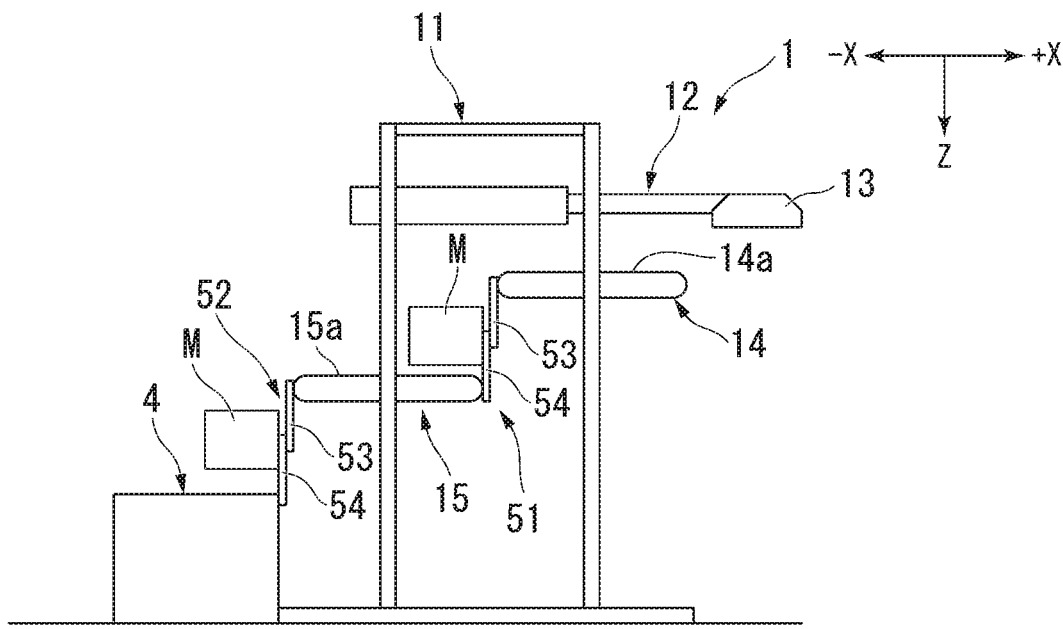

FIGS. 6A and 6B show the transporter 1 of the embodiment. In addition, FIG. 6A shows the first conveyor 14 positioned below the second conveyor 15. Moreover, FIG. 6B shows the first conveyor 14 positioned above the second conveyor 15.

As shown in FIGS. 6A and 6B, the transporter 1 includes the first and second extensible members 51 and 52.

The first extensible member (first extensible connection plate) 51 is provided between the downstream end of the first conveyor 14 and the upstream end of the second conveyor 15. The first extensible member 51 is connected to each of the downstream end of the first conveyor 14 and the upstream end of the second conveyor 15. In addition, for example, "being connected to the end of the conveyor" referred to in the embodiments includes a case where a belt is connected to the conveyor via a support which is provided at a position deviated from the end of the conveyor, or the like. In addition, the connection structures of the extensible members 51 and 52 with respect to the ends of the conveyors 14 and 15 are not limited to the example.

Specifically, the first extensible member 51 includes a first member 53 and a second member 54. For example, widths in the first member 53 and the second member 54 in the Y-direction are substantially the same as the widths of the first conveyor 14 and the second conveyor 15 in the Y-direction.

The first member (first slide member, first plate) 53 is connected to the downstream end of the first conveyor 14, and is slidable with respect to the first conveyor 14 in the Z-direction.

In addition, in a case where the first conveyor 14 is lifted, the upper end of the first member 53 engages with the first conveyor 14 and is lifted by the first conveyor 14. The lower end of the first member 53 is restrained from moving below the lower end of the second member 54 by a stopper (not shown).

The second member (second slide member, second plate) 54 is connected to the upper end of the second conveyor 15 and is slidable with respect to the second conveyor in the Z-direction.

In addition, the upper end of the second member 54 is restrained from moving below the second conveyor 15 by a stopper (not shown). The upper end of the second member 54 is connected to the first member 53 and is slidable with respect to the first member 53 in the Z-direction. In a case where the first member 53 is lifted, the upper end of the second member 54 engaged with the first member 53 and is lifted by the first member 53. The lower end of the second member 54 is restrained from moving above the second conveyor 15 by a stopper (not shown). In addition, the first extensible member 51 may be configured of three or more members instead of the two members 53 and 54.

According to this configuration, as shown in FIG. 6A, in the case where the second conveyor 15 is positioned above the first conveyor 14, the first extensible member 51 protrudes upward from the conveyance surface 14a of the first conveyor 14 so as to align the height of the second conveyor 15. If the first extensible member 51 protrudes upward from the conveyance surface 14a of the first conveyor 14, the first extensible member 51 restrains the movement of the object M, which is placed on the first conveyor 14, in the −X-direction.

On the other hand, as shown in FIG. 6B, in a case where the second conveyor 15 moves downward from the first conveyor 14, the first extensible member 51 is extends between the first conveyor 14 and the second conveyor IS. Accordingly, the first extensible member 51 blocks at least a portion of the gap between the first conveyor 14 and the second conveyor 15.

The second extensible member (second extensible connection plate) 52 is provided between the downstream end of the second conveyor 15 and the upstream end of the input conveyor 4. The second extensible member 52 is connected to each of the downstream end of the second conveyor 15 and the upstream end of the input conveyor 4. The second extensible member 52 includes a first member 53 and a second member 54. In addition, the details of the second extensible member 52 are substantially the same as those of the first extensible member 51. That is, with respect to the descriptions of the first extensible member 51, in descriptions of the second extensible member 52, the "first extensible member 51" may be replaced with the "second extensible member 52", the "first conveyor 14" may be replaced with the "second conveyor 15", the "conveyance surface 14a" may be replaced with the "conveyance surface 15a", and the "second conveyor 15" may be replaced with the "input conveyor 4".

Similarly to the first embodiment, according to this configuration, it is possible to increase the speed of the conveyance. Moreover, in the embodiment, the transporter 1 includes the first extensible member 51 which is provided between the first conveyor 14 and the second conveyor 15 and extends between the first conveyor 14 and the second conveyor 15 in the case where the first conveyor 14 moves in the direction of moving away from the second conveyor 15. According to this configuration, in a case where the first conveyor 14 is positioned above the second conveyor 15, it is possible to prevent the object M from being dropped from the gap between the first conveyor 14 and the second conveyor 15. In other words, since it is possible to prevent the object M from being dropped by the first extensible member 51, it is possible to move the object M from the conveyor 14 to the second conveyor 15 even when the heights of the first conveyor 14 and the second conveyor 15 are not completely aligned with each other. Accordingly, it is possible to further increase the speed of the conveyance. In addition, for example, in the case where the first conveyor 14 is positioned at a higher position than that of the second conveyor 15, since the object M slides along the surface of the first extensible member 51, it is possible to deliver the object M from the first conveyor 14 to the second conveyor 15. In this viewpoint, it is possible to further increase the speed of the conveyance. This is similarly applied to the case where the second extensible member 52 is provided between the second conveyor 15 and the input conveyor 4.

Here, time may be relatively required to perform stopping, acceleration, or deceleration of the conveyors 14 and 15.

Accordingly, if the stopping, acceleration, or deceleration of the conveyors 14 and 15 is frequently repeated, conveyance of the object M may be delayed. On the other hand, if the upstream conveyors 14 and 15 are always rotated in a state where the upstream conveyors 14 and 15 are positioned below the downstream conveyors 15 and 4, the object M conveyed to the upstream conveyors 14 and 15 may come into contact with the downstream conveyors 15 and 4 during the rotation of the object M. In this case, the object M is likely to be dropped from the transporter 1.

Accordingly, in the embodiment, the transporter 1 includes the member (first extensible member 51) which is provided between the first conveyor 14 and the second conveyor 15 and protrudes upward from the conveyance surface 14a of the first conveyor 14 in the case where the first conveyor 14 is positioned below the second conveyor 15. According to this configuration, the downstream movement of the object M, which moves on the first conveyor 14, is restrained by the extensible member 51. In other words, the object M is not likely to be dropped from the transporter 1, and thus, it is possible to continuously rotate the first conveyor 14. Accordingly, it is possible to prevent frequent stoppage, acceleration, or deceleration of the first conveyor 14. Therefore, it is possible to further increase the speed of the conveyance. In addition, if the heights of the first conveyor 14 and the second conveyor 15 are aligned with each other, the extensible member 51 moves below the conveyance surface 14a of the first conveyor 14. Accordingly, the object M which has been stopped by the extensible member 51 is automatically delivered to the downstream side. This is similarly applied to the case where the second extensible member 52 is provided between the second conveyor 15 and the input conveyor 4. In addition, the transporter 1 may have any one of the first extensible member 51 and the second extensible member 52.

Fourth Embodiment

Next, a fourth embodiment will be described with reference to FIGS. 7A and 7B.

The embodiment is different from the first embodiment in that rotators 61 which incline the conveyors 14 and 15 are provided. In addition, configurations except for configurations described below are similar to those of the first embodiment.

Figure 7A:
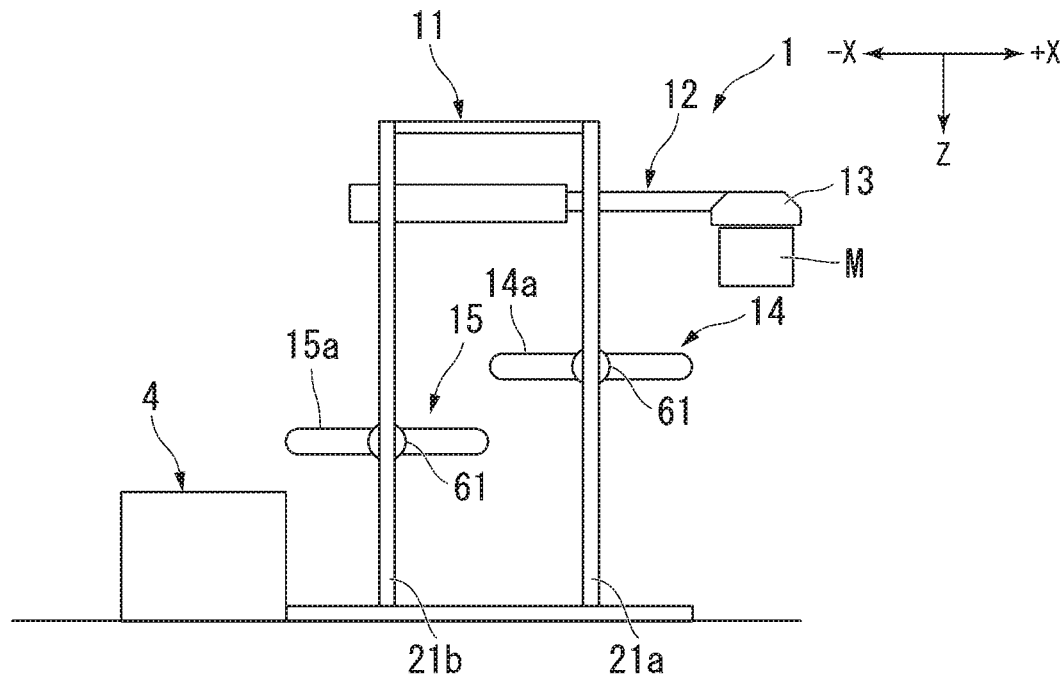
FIGS. 7A and 7B are side views showing a transporter of a fourth embodiment.
Figure 7B:
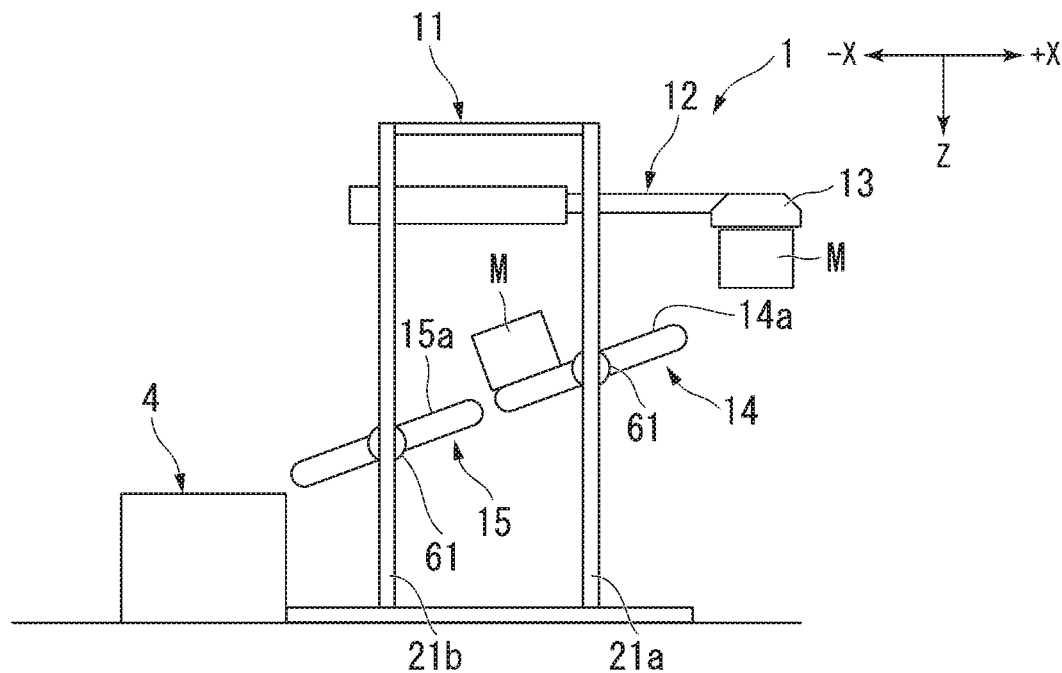

FIGS. 7A and 7B show the transporter 1 of the embodiment. In addition, FIG. 7A shows the first and second conveyors 14 and 15 positioned substantially horizontally. FIG. 7B shows the first and second conveyors 14 and 15 inclined with respect to the horizontal direction.

As shown in FIGS. 7A and 7B, in the embodiment, each of the first and second conveyors 14 and 15 includes the rotator (conveyor inclination mechanism) 61 which actively inclines the entirety of each of the conveyors 14 and 15 with respect to the horizontal direction. For example, the rotator 61 includes a support in which the posture of the support is fixed with respect to each of the supports 21a and 21b, and a rotor which is supported by the support and is rotated around the support.

Next, a control operation of the controller 16 of the embodiment will be described.

In a case where the second conveyor 15 moves to substantially the same height as that of the first conveyor 14, the controller 16 of the embodiment controls the rotator 61 of the first conveyor 14 so as to incline the first conveyor 14. Specifically, the controller 16 inclines the first conveyor 14 in a direction which the downstream end of the first conveyor 14 approaches the second conveyor 15. In addition, in the case where the second conveyor 15 moves to substantially the same height as that of the first conveyor 14, the controller 16 controls the rotator 61 of the second conveyor 15 so as to incline the second conveyor 15. Specifically, the controller 16 inclines the second conveyor 15 in a direction which the upstream end of the second conveyor 15 approaches the first conveyor 14. For example, the controller 16 inclines the first and second conveyors 14 and 15 such that the inclination angle of the first conveyor 14 (for example, the inclination angle of the conveyance surface 14a) and the inclination angle (for example, the inclination angle of the conveyance angle 15a) of the second conveyor 15 are substantially the same as each other. For example, the controller 16 inclines the first and second conveyors 14 and 15 such that the conveyance surface 14a of the first conveyor 14 is positioned on substantially the same flat surface as the conveyance surface 15a of the second conveyor 15 or is positioned slightly above the conveyance surface 15a of the second conveyor 15.

In addition, from another viewpoint, in a case where the second conveyor 15 moves to substantially the same height as that of the input conveyor 4, the controller 16 controls the rotator 61 of the second conveyor 15 so as to incline the second conveyor 15. Specifically, the controller 16 inclines the second conveyor 15 in a direction in which the downstream end of the second conveyor 15 approaches the input conveyor 4.

According to this configuration, similarly to the first embodiment, it is possible to increase the speed of the conveyance. Moreover, in the embodiment, each of the first and second conveyors 14 and 15 has the rotator 61 which inclines each of the first and second conveyors 14 and 15 with respect to the horizontal direction. According to this configuration, compared to the case where the heights of the first and second conveyors 14 and 15 are aligned with each other by only the lifting and lowering operations, it is possible to align the heights thereof with each other at a higher speed. Accordingly, it is possible to further increase the speed of the conveyance. In addition, in the transporter 1, any one of the first and second conveyors 14 and 15 may have the rotator 61.

Fifth Embodiment

Next, a fifth embodiment will be described with reference to FIGS. 8 to 10.

The embodiment is different from the first embodiment in that restrainers 71 which restrain the movement of the object M are provided. Moreover, configurations except for configurations described below are similar to those of the first embodiment.

Figure 8A:
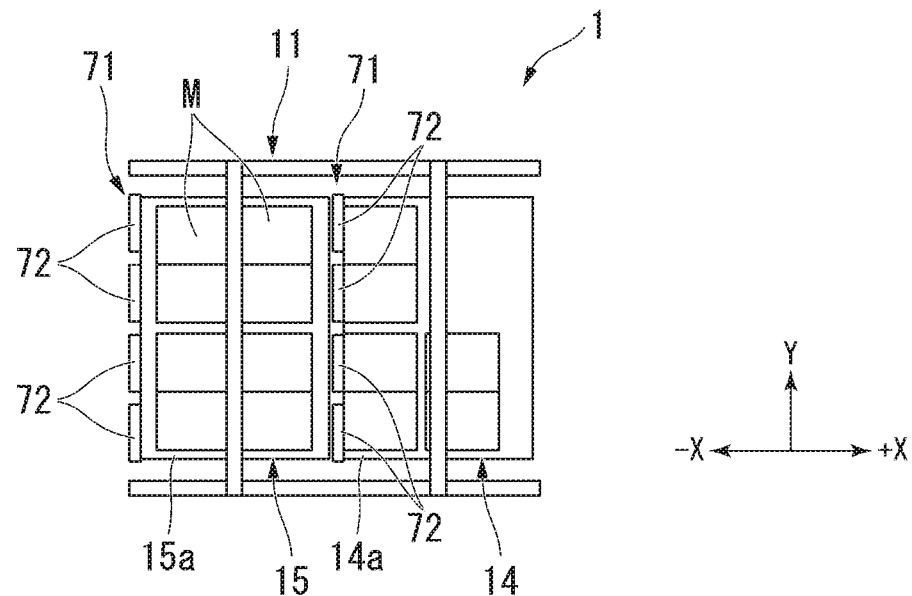
FIGS. 8A and 8B are views showing a transporter of a fifth embodiment.
Figure 8B:
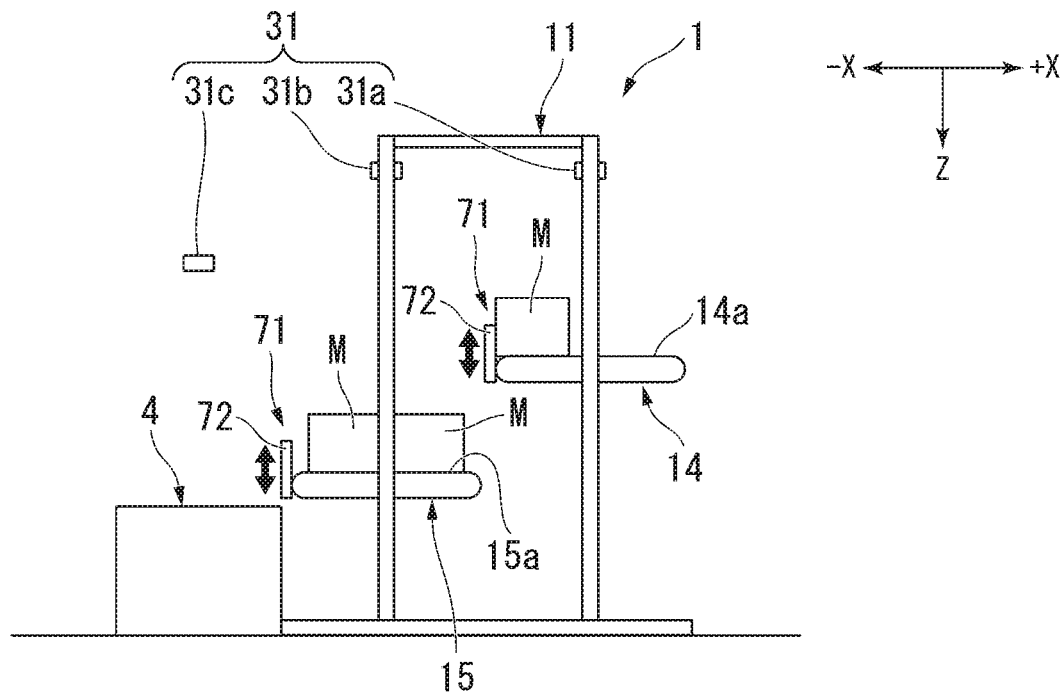

FIGS. 8A and 8B show the transporter 1 of the embodiment. In addition, FIG. 8A is a plan view showing the transporter 1. Moreover, FIG. 8B is a side view showing the transporter 1. In the drawings with respect to the following embodiments including the embodiment, for convenience of description, the arm device 12 or the holder 13 may not be shown.

As shown in FIGS. 8A and 8B, in the embodiment, the transporter 1 includes the restrainers 71. Each of the restrainers 71 is provided on the downstream end of each of the first and second conveyors 14 and 15. In addition, for example, "being provided to the end of the conveyor" referred to in the embodiments includes a case where a belt is provided to the conveyor via a support which is provided at a position deviated from the end of the conveyor, or the like. In addition, the attachment structures of the restrainers 71 with respect to the ends of the conveyors 14 and 15 are not limited to the above-described example.

Moreover, in other expressions, the restrainers 71 are provided along the downstream ends of the first and second conveyors 14 and 15.

Each of the restrainers 71 is a buffer mechanism which restrains the movement (passage of the object M) of the object M and retains the object M in the conveyors 14 and 15. For example, the restrainers 71 can retain the object M in the conveyors 14 and in a state where the conveyors 14 and 15 are always rotated.

In the embodiment, each of the restrainers 71 includes a plurality of restraint members (active claws) 72 which are arranged along the downstream end of each of the first and second conveyors 14 and 15. Each of the plurality of restraint members 72 is movable between a release position (first position) at which each restraint member 72 is positioned below the conveyance surfaces 14a and 15a of the conveyors 14 and 15 and allows the passage of the object M and a restraint position (second position) at which each restraint member 72 protrudes upward from the conveyance surfaces 14a and 15a and restrains the movement of the object M. Each of the plurality of restraint members 72 can restrain the movement of the object M which faces each restraint member 72. In addition, the plurality of restraint members 72 can be controlled independently from each other by the controller 16. That is, the plurality of restraint members 72 are individually moved between the release position and the restraint position.

As shown in FIGS. 8A and 8B, the detector 31 of the embodiment includes first to third detectors 31a, 31b, and 31c. The first detector 31a detects the position of the object M on the first conveyor 14.

The second detector 31b detects the position of the object M on the second conveyor 15. The third detector 31c detects the position of the object M on the input conveyor 4. For example, each of the first to third detectors 31a, 31b, and 31c is realized by the above-described sensor (for example, camera) 36 and recognizer 37. In addition, in FIGS. 8A and 8B, the first to third detectors 31a, 31b, and 31c are schematically shown so as to be associated with the conveyors 14, 15, and 4. The detection results of the first to third detectors 31a, 31b, and 31c are sent to the controller 16. The controller 16 individually controls the plurality of restraint members 72 of the first and second conveyors 14 and 15, based on the detection results of the first to third detectors 31a, 31b, and 31c.

Next, the control operation of the controller 16 of the embodiment will be described.

As shown in FIGS. 8A and 8B, the controller 16 moves the restraint members 72 of the first conveyor 14 to the restraint positions, and thus, collects the plurality of objects M on the first conveyor 14. While the controller 16 collects the plurality of objects M on the first conveyor 14, the controller 16 moves the second conveyor 15 to substantially the same height as that of the input conveyor 4 and delivers the object M from the second conveyor 15 to the input conveyor 4. Thereafter, the controller 16 returns the second conveyor 15 to substantially the same height as that of the first conveyor 14. In the state where the second conveyor 15 is returned to substantially the same height as that of the first conveyor 14, the controller 16 moves the plurality of restraint members 72 of the first conveyor 14 to the release positions all at once. Accordingly, the plurality of objects M, which are collected on the first conveyor 14 by the restraint members 72, move to the second conveyor 15 all at once.

Figure 9A:
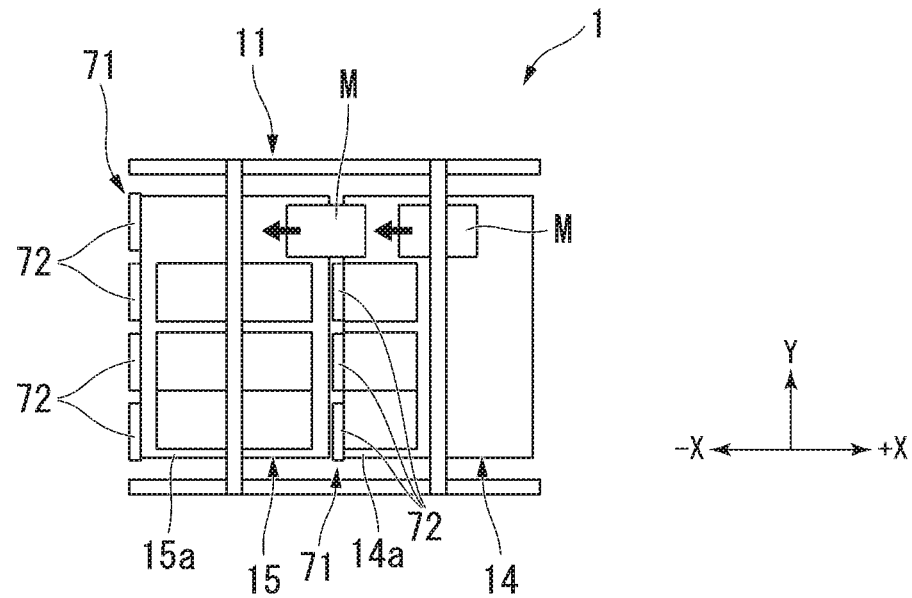
FIGS. 9A and 9B are views showing an operation example of the transporter of the fifth embodiment.
Figure 9B:
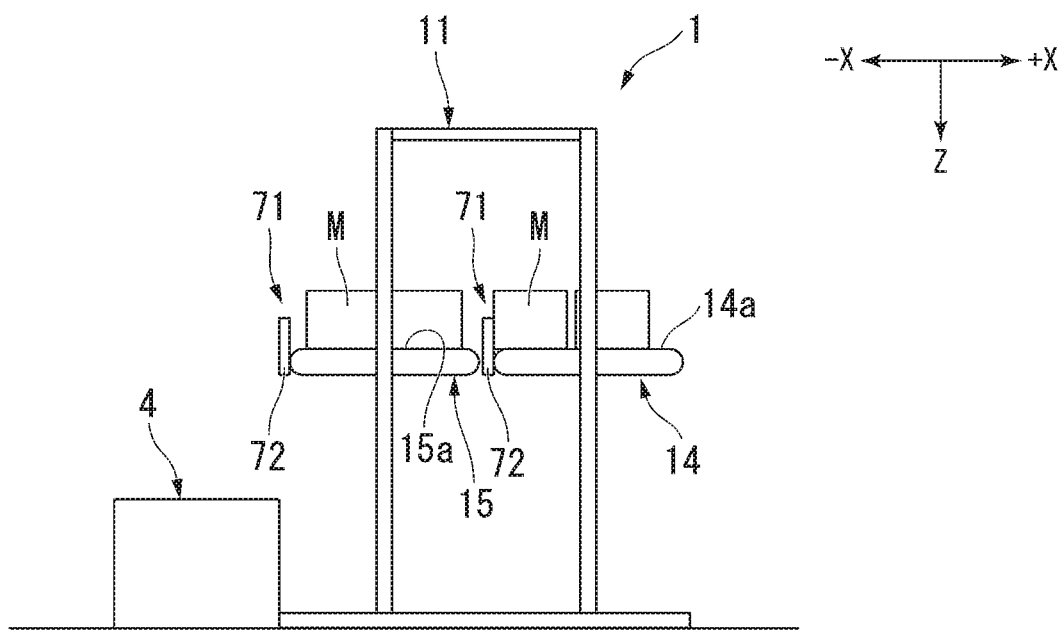

FIGS. 9A and 9B show an example of the operation of the transporter 1 of the embodiment. In addition, FIG. 9A is a plan view showing the transporter 1. FIG. 9B is a side view showing the transporter 1.

As shown in FIGS. 9A and 9B, the controller 16 individually operates the restraint members 72 of the first conveyor 14 corresponding to the unoccupied locations of the second conveyor 15 based on the detection results of the above-described first and second detectors 31a and 31b such that the unoccupied locations of the second conveyor are appropriately occupied by the objects M. Specifically, the controller 16 positions the restraint members 72 of the first conveyor 14 corresponding to the unoccupied locations of the second conveyor 15 at the release positions. In addition, the controller 16 positions other restraint members 72 of the first and second conveyors 14 and 15 at the restraint positions. Moreover, the controller 16 rotates the first conveyor 14 and the second conveyor 15. Accordingly, the objects M are delivered to the unoccupied locations of the second conveyor 15. Moreover, the "restraint members corresponding to the unoccupied locations of the second conveyor" mean the restraint members which are positioned on the upstream side in the conveyance direction (for example, −X-direction) of the object M with respect to the unoccupied locations of the second conveyor.

Next, the movement of the object M from the second conveyor 15 to the input conveyor 4 will be described.

In the embodiment, as shown in FIGS. 8A and 8B, the controller 16 moves the restraint members 72 of the second conveyor 15 to the restraint positions, and the plurality of objects M are collected on the second conveyor 15. In the state where the plurality of objects M are collected on the second conveyor 15, the controller 16 moves the second conveyor 15 to substantially the same height as that of the input conveyor 4.

Figure 10:
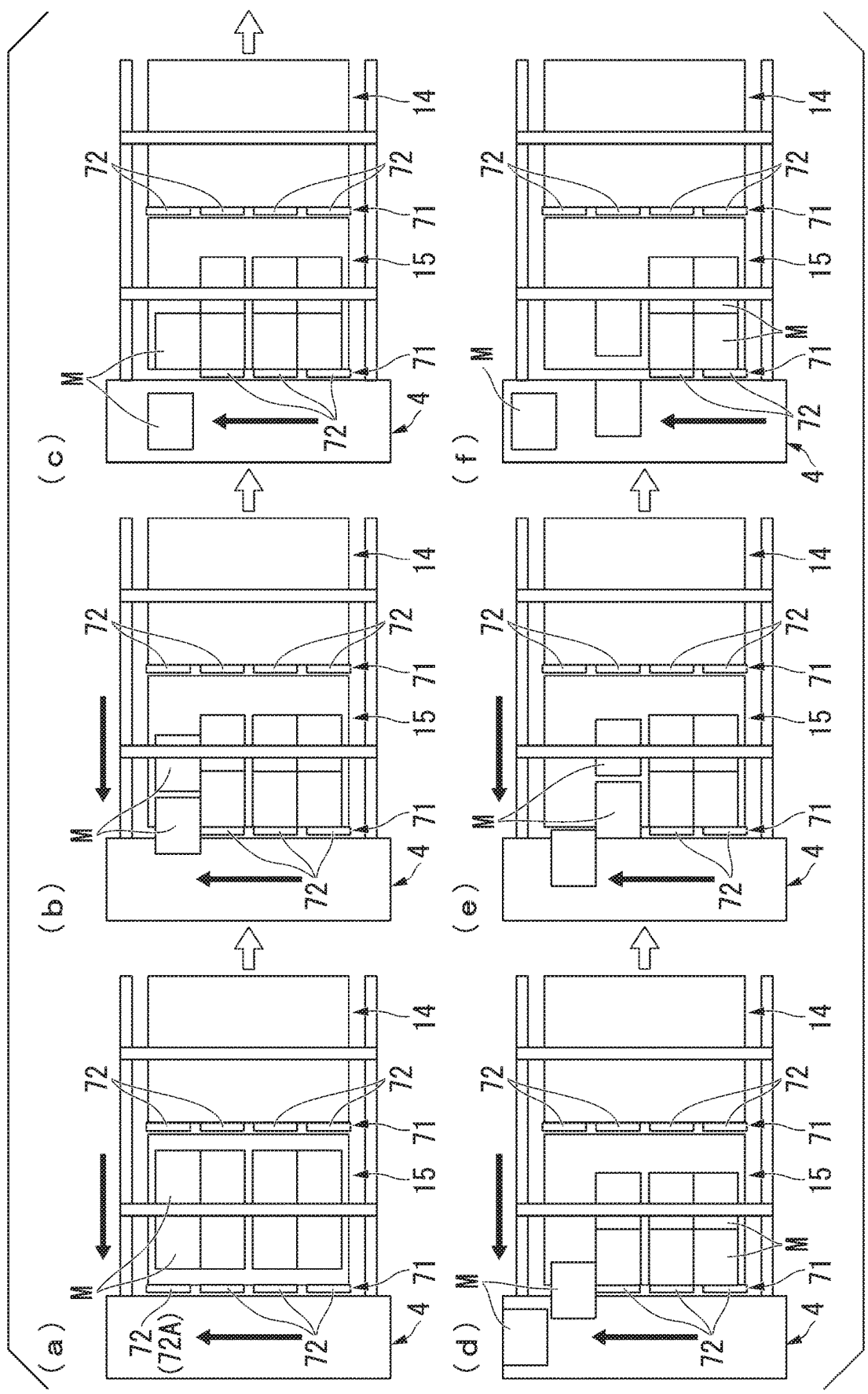
FIG. 10 is a plan view showing another operation example of the transporter of the fifth embodiment.

FIG. 10 shows an example of the conveyance of the object M from the second conveyor 15 to the input conveyor 4. In addition, in FIG. 10, for convenience of description, the restraint members 72 which have been moved to the release positions are not shown.

As shown in FIG. 10, the controller 16 separates the objects M which are densely collected on the second conveyor 15, and delivers the objects M to the input conveyor 4. Specifically, among the plurality of restraint members 72 of the second conveyor 15, first, the controller 16 moves one restraint member 72 (hereinafter, referred to as a restraint member 72A) to the release position. Accordingly, the object M which is restrained by the restraint member 72A moves away from the adjacent object M in the Y-direction and is delivered to the input conveyor 4. In addition, if one object M passes the restraint member 72A, the controller 16 moves the restraint member 72A to the restraint position again. Accordingly, the subsequent object M is temporarily stopped, and the movement of the subsequent object M is delayed. As a result, the gaps between the plurality of objects M arranged in the −X-direction increase. By repeating this, the objects M which are in close contact with each other in the −X-direction move away from each other. Instead of this, after one object M passes the restraint member 72A, the controller 16 temporarily decreases the conveyance speed (for example, a belt speed) of the second conveyor 15, and thus, the subsequent object M is delayed, and the gaps between the plurality of objects M arranged in the −X-direction may increase.

After all the objects M which have been restrained by the restraint member 72A are conveyed to the input conveyor 4, the controller 16 performs the above-described operation on other restraint members 72. Accordingly, the objects M which are in close contact with each other in the −X-direction and the Y-direction move away from each other, and are delivered from the second conveyor 15 to the input conveyor 4.

According to this configuration, similarly to the first embodiment, it is possible to increase the speed of the conveyance. In addition, in the embodiment, the transporter 1 includes the restrainer 71 which can restrain the movement of the object M. The restrainer 71 is provided on the downstream end of the first conveyor 14 and can restrain the movement of the object M. According to this configuration, it is possible to collect the plurality of objects M on the first conveyor 14. Accordingly, it is possible to move the plurality of objects M from the first conveyor 14 to the second conveyor 15 all at once. Therefore, for example, it is possible to decrease the number of times of movement of the second conveyor 15 moving toward the input conveyor 4, and it is possible to further increase the speed of the conveyance.

In the embodiment, the restrainer 71 includes the plurality of restraint members 72 which can restrain the movement of the object M. The plurality of restraint members 72 can be controlled independently from each other. According to this configuration, it is possible to deliver the object M to the unoccupied locations of the second conveyor 15. Therefore, it is possible to increase the number of the objects M which are carried by the second conveyor 15 all at once. Accordingly, it is possible to decrease the number of times of movement of the second conveyor 15 moving toward the input conveyor 4, and it is possible to further increase the speed of the conveyance.

In the embodiment, the transporter 1 includes the restrainer 71 which is provided on the downstream end of the second conveyor 15. According to this configuration, in a case where other objects M flow from the upstream side of the input conveyor 4, the objects M are taken out while input of the object M with respect to the input conveyor 4 is stopped, and it is possible to collect the objects M on at least one of the first conveyor 14 and the second conveyor 15. Therefore, it is possible to further increase the speed of the conveyance.

In addition, if the restrainer 71 is provided on the downstream end of the second conveyor 15, it is possible to separate the plurality of objects M arranged in the −X-direction by operating the restrainer 71 and input the objects M to the input conveyor 4.

In the embodiment, the restrainer 71 of the second conveyor 15 includes the plurality of restraint members 72 which can restrain the movement of the object M. The plurality of restraint members 72 can be controlled independently from each other. According to this configuration, since the plurality of restraint members 72 are individually controlled, it is possible to separate the plurality of objects M arranged in the Y-direction and cause the objects M to flow to the input conveyor 4.

In addition, in the transporter 1, the restrainer 71 may be provided on any one of the first and second conveyors 14 and 15.

Sixth Embodiment

Next, a sixth embodiment will be described with reference to FIGS. 11 to 12.

The embodiment is different from the first embodiment in that a separation mechanism 81 which separates the plurality of objects M from each other is provided. In addition, configurations except for configurations described below are similar to those of the first embodiment.

Figure 11A:
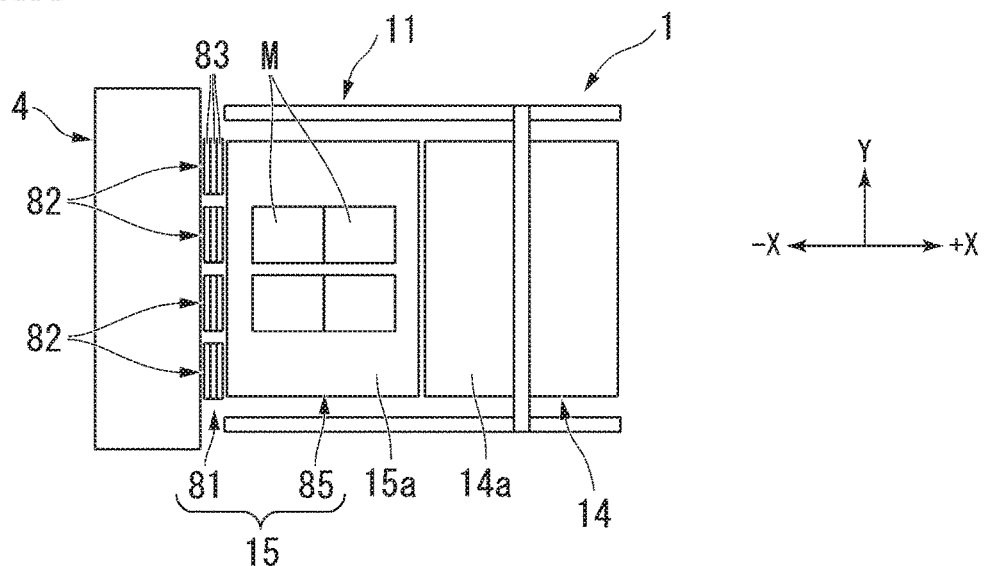
FIGS. 11A to 11C are plan views showing a transporter of a sixth embodiment.
Figure 11B:
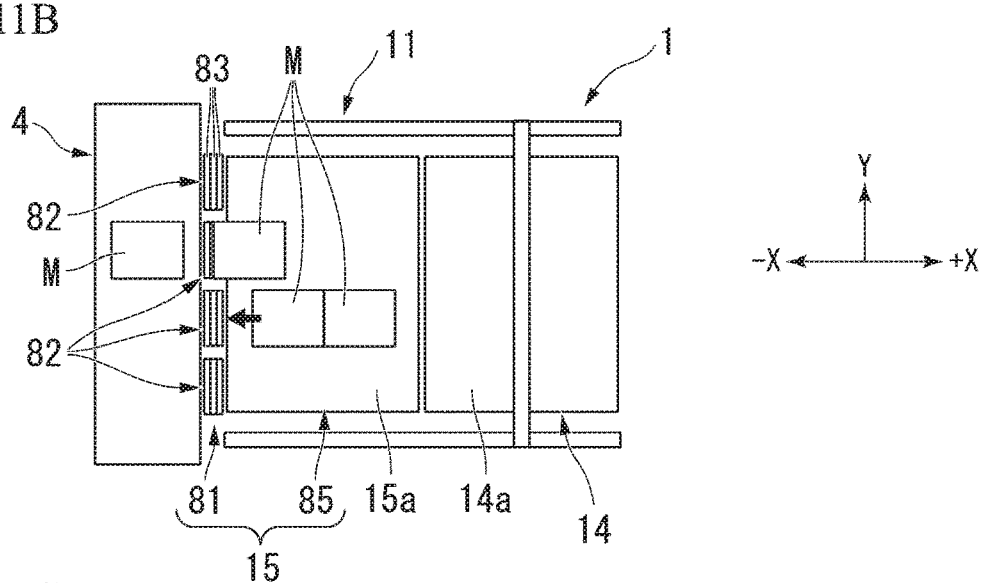
Figure 11C:
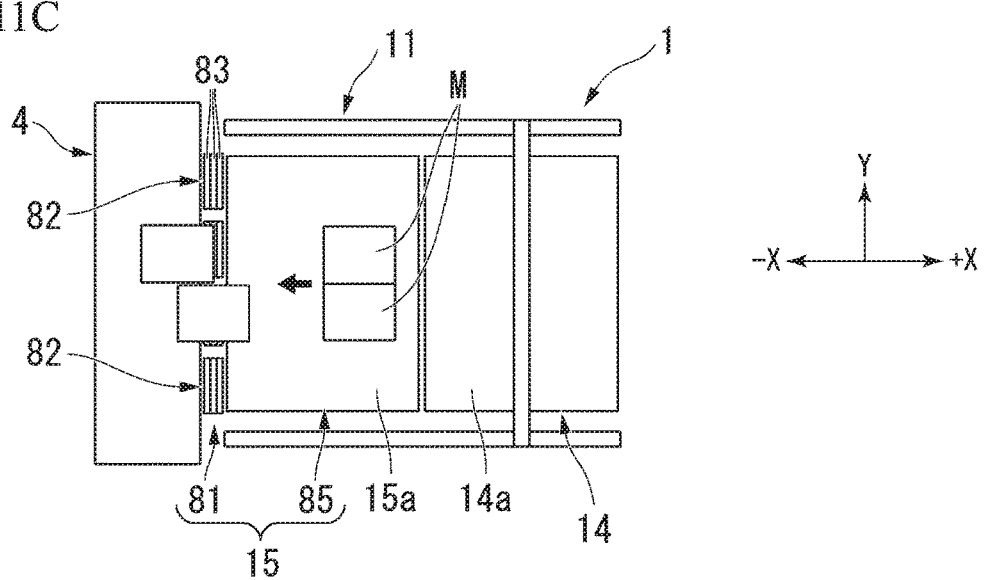

FIGS. 11A to 11C show the transporter 1 of the embodiment.

As shown in FIGS. 11A to 11C, the second conveyor 15 of the embodiment includes the separation mechanism 81 which separates the plurality of objects M from each other. The separation mechanism 81 is provided on the downstream end of the second conveyor 15. In other words, the second conveyor 15 includes a general conveyor unit 85 and the separation mechanism 81 which is provided on the downstream side of the conveyor unit 85. The conveyor unit 85 receives the object M from the first conveyor 14 and conveys the object M in the −X-direction. For example, the conveyor unit 85 has substantially the same configuration as that of the second conveyor 15 of the first embodiment. The general conveyor unit 85 is an example of the "transport unit", and is an example of "other portions which convey the object on the second conveyor". In addition, in other expressions, the separation mechanism 81 is provided along the downstream end of the second conveyor 15.

As shown in FIGS. 11A to 11C, the separation mechanism 81 of the embodiment includes a plurality of separators 82 which are provided so as to move away from each other in the Y-direction.

Figure 12:
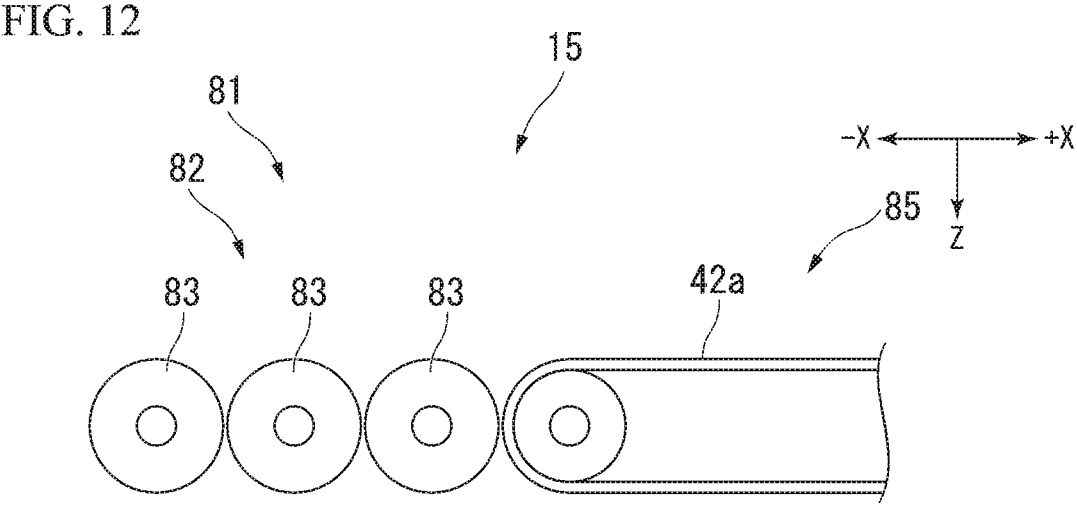
FIG. 12 is a side view showing a separator of the sixth embodiment.

FIG. 12 shows an example of the separator 82.

As shown in FIG. 12, each separator 82 includes a plurality of rollers (terminal rollers) 83 which are actively rotated. In addition, the number of the rollers 83 included in each separator 82 may be one. In the embodiment, the plurality of rollers 83 are arranged in the −X-direction. The plurality of rollers 83 are rotated and stopped independently from the conveyor unit 85 by the controller 16. The plurality of roller 83 can rotate at a speed different from that of the conveyor unit 85. For example, the plurality of rollers 83 are rotated at a faster speed than that of the conveyor unit 85. In addition, the plurality of separators 82 adjacent to each other in the Y-direction can rotate at speeds different from each other.

Next, the control operation of the controller 16 of the embodiment will be described.

As shown in FIG. 11B, in a case where the plurality of objects M which are in close contact with each other in the −X-direction move away from each other, the controller 16 causes the rotating speeds (conveyance speed) of the rollers 83 of the separators 82 to be faster than the rotating speed (conveyance speed) of the general conveyor unit 85. Accordingly, the preceding object M is accelerated at the moment the object M is placed on the separator 82, and the preceding object M moves away from the subsequent object M. Accordingly, the plurality of objects M, which are in close contact with each other in the −X-direction, move away from each other.

Moreover, as shown in FIG. 11C, in a case where the plurality of objects M which are in close contact with each other in the Y-direction move away from each other, the controller 16 sets the speeds of two separators 82 adjacent to each other in the Y-direction to speeds different from each other. Accordingly, the objects M arranged in the Y-direction are deviated from each other, and are delivered to the input conveyor 4.

According to this configuration, similarly to the first embodiment, it is possible to increase the speed of the conveyance. In addition, in the embodiment, the second conveyor 15 includes the rollers 83 which are provided on the downstream end of the second conveyor 15 and can convey the object M at a speed different from those of other portions (for example, conveyor unit 85) which convey the object M on the second conveyor 15. According to this configuration, it is possible to separate the plurality of objects M, which are in close contact with each other in the −X-direction, from each other, and input the objects M to the input conveyor 4. In addition, according to this configuration, it is possible to separate the plurality of objects M which are in close contact with each other from each other without vertically moving the restraint members 72 or without temporarily decreasing the belt speed of the second conveyor 15.

Accordingly, it is possible to further increase the speed of the conveyance.

In addition, the separation mechanism 81 may be provided so as to move away from the second conveyor 15. In this case, the separation mechanism 81 is disposed between the second conveyor 15 and the input conveyor 4. In this case, the separation mechanism 81 is provided along the end of the second conveyor 15. In this case, the rollers 83 of the separation mechanism 81 can convey the object M at a speed (for example, a faster speed than that of the second conveyor 15) different from that of the second conveyor 15.

Seventh Embodiment

Next, a seventh embodiment will be described with reference to FIG. 13.

The embodiment is different from the sixth embodiment in that the separation mechanism 81 is provided in the first conveyor 14. In addition, configurations except for configurations described below are similar to those of the sixth embodiment.

Figure 13:
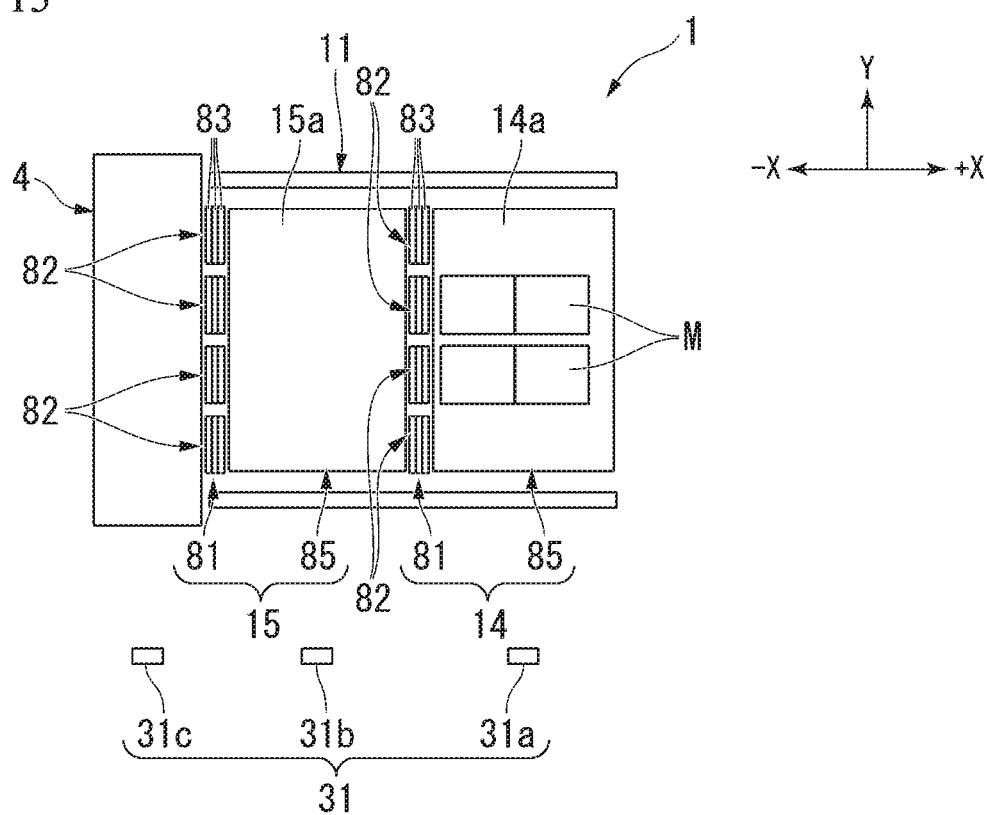
FIG. 13 is a plan view showing a transporter of a seventh embodiment.

As shown in FIG. 13, the first conveyor 14 of the embodiment includes the separation mechanism 81 which is provided on the downstream end of the first conveyor 14. In other words, the first conveyor 14 includes the general conveyor unit 85 and the separation mechanism 81 which is provided on the downstream side of the conveyor unit 85. The conveyor unit 85 of the first conveyor 14 receives the object M carried by the arm device 12 and conveys the object M in the −X-direction. For example, the conveyor unit 85 of the first conveyor 14 has substantially the same configuration as that of the first conveyor 14 of the first embodiment. The general conveyor unit 85 is an example of the "transport unit", and is an example of "other portions which convey the object on the first conveyor". In addition, in other expressions, the separation mechanism 81 is provided along the downstream ends of the first conveyor 14. In addition, the configuration and function of the separation mechanism 81 of the first conveyor 14 are substantially the same as the configuration and function of the separation mechanism 81 described in the sixth embodiment. That is, the separation mechanism 81 of the first conveyor 14 can convey the object M at a speed (for example, a faster speed) different from that of the conveyor unit 85 of the first conveyor 14.

Similarly to the fifth embodiment, the detector 31 of the embodiment includes the first to third detectors 31a, 31b, and 31c. In addition, in FIG. 13, the first to third detectors 31a, 31b, and 31c are schematically shown so as to be associated with the conveyors 14, 15, and 4. The detection results of the first to third detectors 31a, 31b, and 31c are sent to the controller 16. The controller 16 individually controls the plurality of separators 82 provided on the end of the first conveyor 14 and the plurality of separators 82 provided on the end of the second conveyor 15, based on the detection results of the first to third detectors 31a, 31b, and 31c.

According to this configuration, similarly to the first embodiment, it is possible to increase the speed of the conveyance. In addition, in the embodiment, the transporter 1 includes the separation mechanism 81 on the downstream end of the first conveyor 14 in addition to the downstream end of the second conveyor 15. According to this configuration, it is possible to increase the speed of the separation function due to the plurality of separation mechanism 81. Therefore, it is possible to process more objects M at a high speed.

Moreover, the separation mechanism 81 provided on the downstream end of the first conveyor 14 may be provided so as to move away from the first conveyor 14. In this case, the separation mechanism 81 is disposed between the first conveyor 14 and the second conveyor 15. In this case, the separation mechanism 81 is provided along the end of the first conveyor 14. In this case, the rollers 83 of the separation mechanism 81 can convey the object M at a speed (for example, a faster speed than that of the first conveyor 14) different from that of the first conveyor 14.

Eighth Embodiment

Next, an eighth embodiment will be described with reference to FIGS. 14A and 14B.

In the embodiment, the movement direction of the second conveyor 15 is different from that of the first embodiment. In addition, configurations except for configurations described below are similar to those of the first embodiment.

Figure 14A:
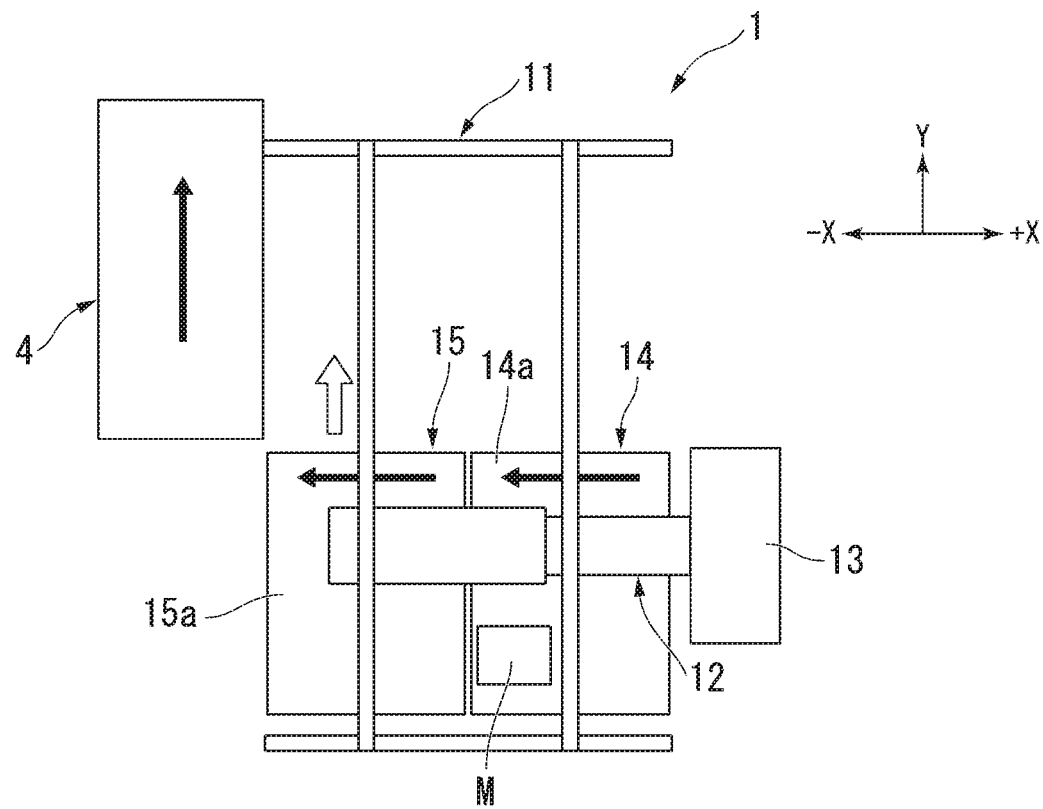
FIGS. 14A and 14B are plan views showing a transporter of an eighth embodiment.
Figure 14B:
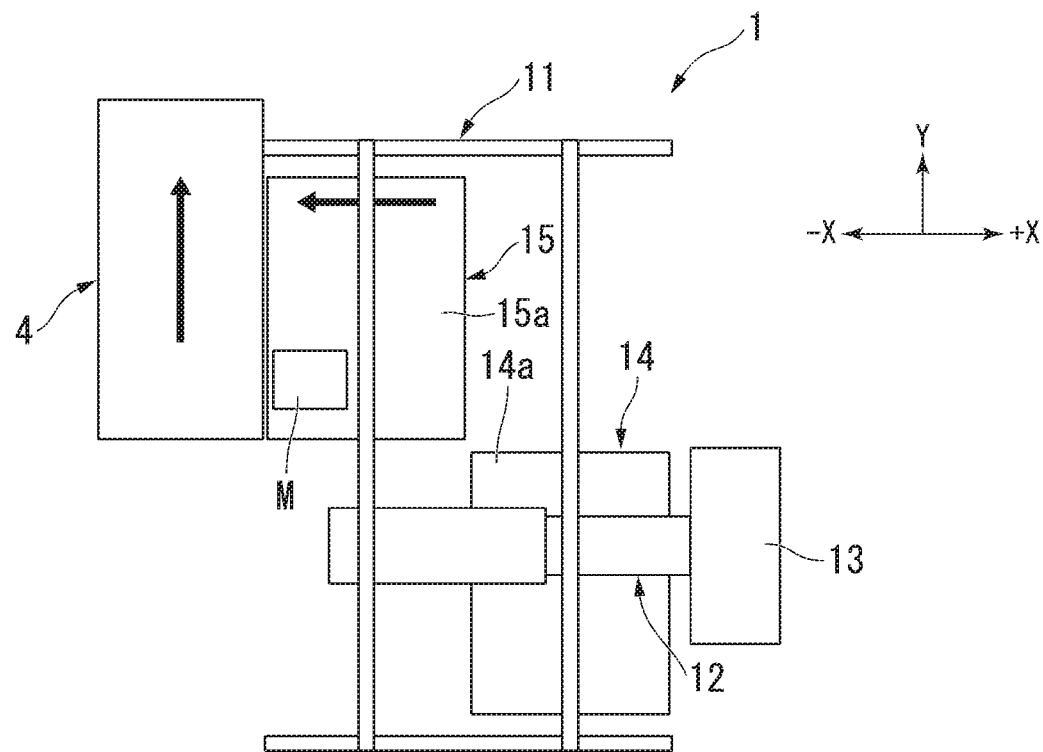

As shown in FIGS. 14A and 14B, in the embodiment, the first conveyor 14 receives the object M carried by the arm device 12, and conveys the object M in the −X-direction. The second conveyor 15 receives the object M from the first conveyor 14 and conveys the object M in the −X-direction. In addition, the second conveyor 15 is movable in the Y-direction by the second conveyor drive mechanism 33. That is, the second conveyor 15 is substantially horizontally movable. In the embodiment, the −X-direction is an example of the "first direction". The Y-direction is an example of the "second direction".

According to this configuration, similarly to the first embodiment, it is possible to increase the speed of the conveyance.

Reference Embodiment

Next, a reference embodiment will be described with reference to FIGS. 15A and 15B.

In the reference embodiment, the arrangement position of the second conveyor is different from that of the first embodiment. In addition, configurations except for configurations described below are similar to those of the first embodiment.

Figure 15A:
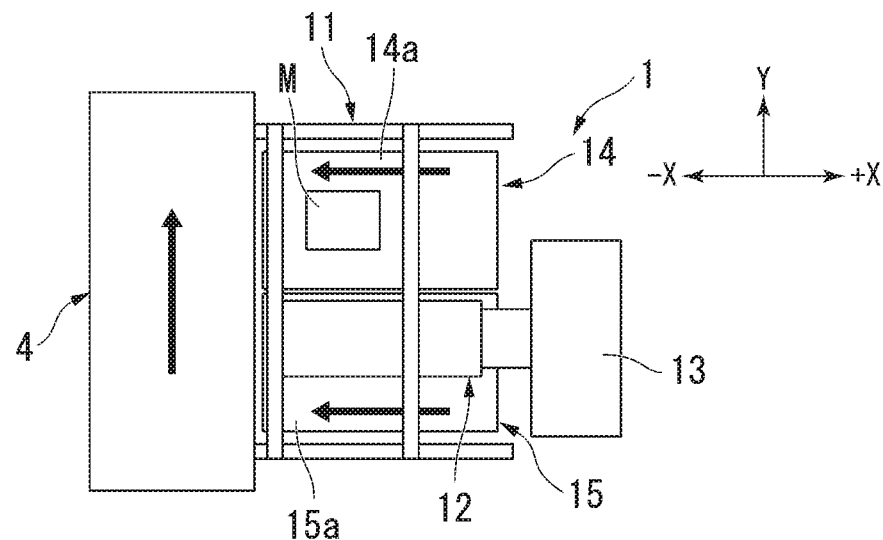
FIGS. 15A and 15B are views showing a transporter of one reference embodiment.
Figure 15B:
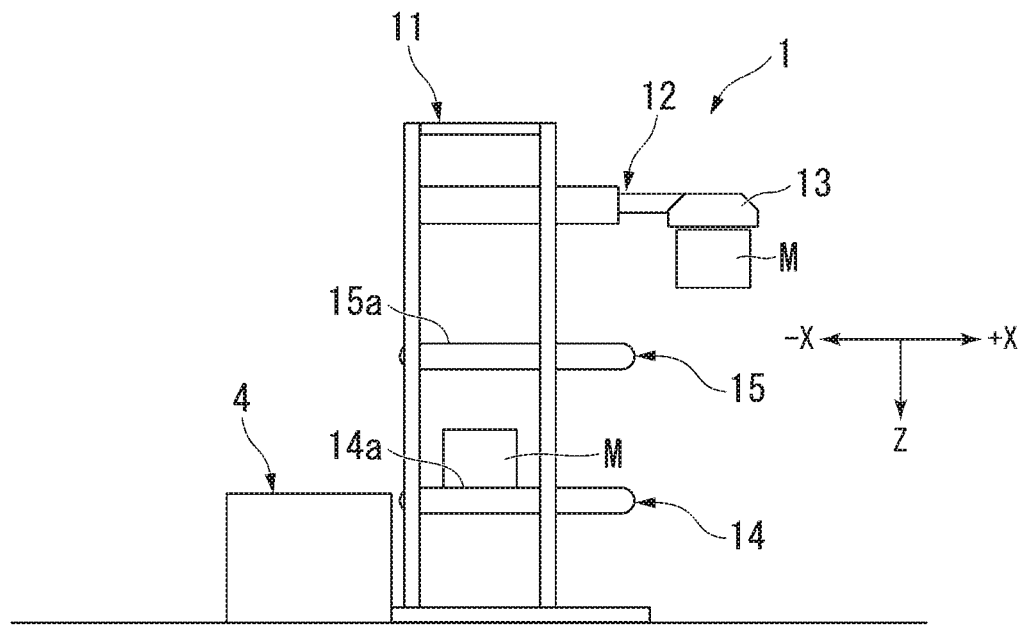

As shown in FIGS. 15A and 15B, in the embodiment, the first and second conveyors 14 and 15 are arranged in the Y-direction.

The first conveyor 14 receives the object M carried by the arm device 12 and conveys the object M in the −X-direction. The first conveyor 14 directly delivers the conveyed object M to the input conveyor 4. Similarly, the second conveyor 15 receives the object M carried by the arm device 12 and conveys the object M in the −X-direction. The second conveyor 15 directly delivers the conveyed object M to the input conveyor 4. In other words, the first and second conveyors 14 and 15 have substantially the same configuration and function as each other.

In the embodiment, the controller 16 controls the position of the arm device 12 in the Y-direction, and alternately places the objects M, which are sequentially taken out from the box pallet 3, on the first conveyor 14 and the second conveyor 15. In addition, in a case where the object M carried by the arm device 12 is placed on the first conveyor 14, the controller 16 moves the first conveyor 14 toward the input conveyor 4. In this case, the controller 16 causes the second conveyor 15 to be in a standby state at a height at which the second conveyor 15 can receive the subsequent object M from the arm device 12. The second conveyor 15 receives the object M from the arm device 12 while the first conveyor 14 moves to the vicinity of the input conveyor 4. If the first conveyor 14 delivers the object M to the input conveyor 4, the controller 16 returns the first conveyor 14 to the height at which the first conveyor 14 can receive the object M from the arm device 12.

Similarly, in a case where the object M carried by the arm device 12 is placed on the second conveyor 15, the controller 16 moves the second conveyor 14 toward the input conveyor 4. In this case, the controller 16 causes the first conveyor 15 to be in a standby state at a height at which the first conveyor 14 can receive the subsequent object M from the arm device 12. The first conveyor 14 receives the object M from the arm device 12 while the second conveyor 15 moves to the vicinity of the input conveyor 4. If the second conveyor 15 delivers the object M to the input conveyor 4, the controller 16 returns the second conveyor 15 to the height at which the second conveyor 15 can receive the object M from the arm device 12.

According to this configuration, since the objects M are alternately placed on the two conveyors 14 and 15, similarly to the first embodiment, the standby time of the arm device 12 does not exist or can be shortened. Accordingly, it is possible to increase the speed of the conveyance. In addition, since the two conveyors 14 and 15 are arranged in the Y-direction, it is possible to decrease the size of the transporter 1 in the −X-direction.

Hereinbefore, some embodiments and the reference embodiment are described. However, the transporters and the transport methods according to the embodiments and reference embodiment are not limited to the examples.

For example, in the above-described embodiments, the first conveyor 14 is in a standby state at the height at which the first conveyor 14 receives the object M from the arm device 12. Instead of this, the first conveyor 14 may move in the Z-direction. For example, in a case where a height difference between the input conveyor 4 and the first conveyor 14 is large, after the first conveyor 14 receives the object M from the arm device 12, the first conveyor 14 may move to the vicinity of the input conveyor 4. Accordingly, it is possible to decrease the movement of the second conveyor 15, and it is possible to further increase the speed of the conveyance.

In addition, in the above-described embodiments, the conveyance direction of the first conveyor 14 and the conveyance direction of the second conveyor 15 are the same as each other. Instead of this, the conveyance direction of the second conveyor 15 may be different from the conveyance direction of the first conveyor 14. For example, the conveyance direction of the first conveyor 14 is the −X-direction, and the conveyance direction of the second conveyor 15 is the Y-direction.

In addition, the position of the first conveyor 14 may be fixed. That is, the first conveyor 14 may not move in the Z-direction.

According to at least one of the above-described embodiments, the transporter includes the first conveyor and the second conveyor. The first conveyor receives the object carried by the arm device and conveys the object in the first direction. The second conveyor receives the object from the first conveyor so as to convey the object, and is movable in the second direction that crosses the first direction. According to this configuration, it is possible to increase the speed of the conveyance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A transporter comprising:
a first conveyor to receive an object, the first conveyor to convey the object in a first direction; and
a second conveyor to receive the object from the first conveyor and to convey the object, the second conveyor being movable in position in a second direction that crosses the first direction, the second direction being a substantially vertical direction,
the second conveyor comprising a conveyor unit which conveys the object and a roller that is provided on a downstream end in an object-conveyance direction on the second conveyor and is configured to convey the object at a speed different from that of the conveyor unit.

2. The transporter according to claim 1, wherein
the first conveyor is movable in the second direction, and wherein
the second conveyor is movable in the second direction independently from the first conveyor.

3. The transporter according to claim 1, wherein
the first conveyor is a belt conveyor.

4. The transporter according to claim 1, wherein
the second conveyor is a belt conveyor.

5. The transporter according to claim 1, wherein
at least one of the first conveyor or the second conveyor comprises a shock absorber configured to relieve an impact that occurs when the object comes into contact with the first conveyor or the second conveyor.

6. The transporter according to claim 1, wherein
at least one of the first conveyor or the second conveyor comprises a restrainer that is provided on a downstream end in an object-conveyance direction on the first conveyor or the second conveyor and is configured to restrain movement of the object.

7. A transporter comprising:
a first conveyor to receive an object, the first conveyor to convey the object in a first direction;
a second conveyor to receive the object from the first conveyor and to convey the object, the second conveyor being movable in position in a second direction that crosses the first direction; and
an extensible member that is provided between the first conveyor and the second conveyor, and extends between the first conveyor and the second conveyor in a case that the second conveyor moves in a direction of moving away from the first conveyor.

8. A transporter comprising:
a first conveyor to receive an object, the first conveyor to convey the object in a first direction; and
a second conveyor to receive the object from the first conveyor and to convey the object, the second conveyor being movable in position in a second direction that crosses the first direction, wherein
at least one of the first conveyor and the second conveyor comprises a rotator,
the rotator comprises: a support in which posture of the support is fixed with respect to a support pillar; and a rotor which is supported by the support and is rotated around the support, and
the rotator is configured to cause the first conveyor or the second conveyor to be inclined in a horizontal direction.

* * * * *